(12) United States Patent
Nakata

(10) Patent No.: US 11,297,299 B2
(45) Date of Patent: Apr. 5, 2022

(54) CAMERA SYSTEM

(71) Applicant: Sony Interactive Entertainment Inc., Tokyo (JP)

(72) Inventor: Masashi Nakata, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 21 days.

(21) Appl. No.: 16/756,738

(22) PCT Filed: Oct. 19, 2018

(86) PCT No.: PCT/JP2018/039053
§ 371 (c)(1),
(2) Date: Apr. 16, 2020

(87) PCT Pub. No.: WO2019/082820
PCT Pub. Date: May 2, 2019

(65) Prior Publication Data
US 2021/0058604 A1  Feb. 25, 2021

(30) Foreign Application Priority Data
Oct. 26, 2017  (JP) .............................. JP2017-206994

(51) Int. Cl.
*H04N 13/243* (2018.01)
*H04N 13/332* (2018.01)
(Continued)

(52) U.S. Cl.
CPC ......... *H04N 13/243* (2018.05); *H04N 13/128* (2018.05); *H04N 13/15* (2018.05);
(Continued)

(58) Field of Classification Search
CPC .. H04N 13/243; H04N 13/128; H04N 13/332; H04N 5/247; H04N 5/23212; G06F 3/011; G06F 3/012
See application file for complete search history.

(56) References Cited

U.S. PATENT DOCUMENTS 5,499,146 A * 3/1996 Donahue .............. H04N 5/9205
386/223
7,429,997 B2  9/2008 Givon
(Continued)

FOREIGN PATENT DOCUMENTS

JP  2004096269 A  3/2004
JP  2004135208 A  4/2004
(Continued)

OTHER PUBLICATIONS

International Preliminary Report on Patentability and Written Opinion for corresponding PCT Application PCT/JP2018/039053, 12 pages dated May 7, 2020.
(Continued)

*Primary Examiner* — Rowina J Cattungal
(74) *Attorney, Agent, or Firm* — Matthew B. Dernier, Esq.

(57) ABSTRACT

A camera system includes a plurality of cameras configured to capture images in different directions. The camera system rotates the plurality of cameras in a predetermined direction. The plurality of cameras are configured such that, even during rotation, one of the cameras captures an image of a preset specific region. The camera system acquires parallax information regarding an object present in the specific region on the basis of a plurality of captured images of the specific region.

19 Claims, 23 Drawing Sheets

(51) Int. Cl.
*H04N 13/128* (2018.01)
*H04N 13/15* (2018.01)
*H04N 13/296* (2018.01)
*H04N 13/00* (2018.01)

(52) U.S. Cl.
CPC ......... *H04N 13/296* (2018.05); *H04N 13/332* (2018.05); *H04N 2013/0081* (2013.01)

(56) References Cited

U.S. PATENT DOCUMENTS

| | | | |
|---|---|---|---|
| 7,548,273 | B2 | 6/2009 | Wada |
| 7,737,975 | B2 | 6/2010 | Sato |
| 8,773,560 | B2 | 7/2014 | Okita |
| 9,064,763 | B2 | 6/2015 | Ozawa |
| 10,367,992 | B2 | 7/2019 | Nakata |
| 2004/0066449 | A1 | 4/2004 | Givon |
| 2005/0104999 | A1* | 5/2005 | Wada .................. H04N 13/239 348/373 |
| 2007/0291143 | A1 | 12/2007 | Barbieri |
| 2009/0135183 | A1 | 5/2009 | Sato |
| 2012/0319222 | A1 | 12/2012 | Ozawa |
| 2013/0120624 | A1 | 5/2013 | Okita |
| 2014/0285703 | A1* | 9/2014 | Kizu ...................... H04N 5/225 348/340 |
| 2015/0185380 | A1* | 7/2015 | Miyashita ......... H01L 27/14621 348/294 |
| 2015/0348580 | A1* | 12/2015 | van Hoff ............... G06T 3/4038 348/38 |
| 2016/0050359 | A1 | 2/2016 | Nakata |
| 2017/0201694 | A1* | 7/2017 | Hasegawa .............. H04N 5/247 |
| 2017/0278262 | A1* | 9/2017 | Kawamoto ........ H04N 5/23238 |
| 2017/0295358 | A1* | 10/2017 | Cabral ................... H04N 5/247 |
| 2017/0363949 | A1* | 12/2017 | Valente ................ H04N 13/161 |
| 2017/0374325 | A1* | 12/2017 | Itoh ...................... G02B 3/0056 |
| 2018/0139431 | A1* | 5/2018 | Simek .................. H04N 5/2258 |
| 2019/0258058 | A1* | 8/2019 | Fortin-Desch nes ... G06F 3/011 |

FOREIGN PATENT DOCUMENTS

| | | |
|---|---|---|
| JP | 2004514951 A | 5/2004 |
| JP | 2005092121 A | 4/2005 |
| JP | 2008515264 A | 5/2008 |
| JP | 2009058533 A | 3/2009 |
| JP | 2012080065 A | 4/2012 |
| JP | 2013106194 A | 5/2013 |
| JP | 2017016431 A | 1/2017 |
| WO | 2014156659 | 10/2014 |

OTHER PUBLICATIONS

Hancock, E.R. "Recovery of surface orientation from diffuse polarization", IEEE Transactions on Image Processing, pp. 1653-1664, Jun. 6, 2006.

International Search Report for corresponding PCT Application PCT/JP2018/039053, 4 pages dated Jan. 8, 2019.

* cited by examiner

ENTERTAINMENT SYSTEM 500

CAMERA SYSTEM 506

FIG.26
(a)
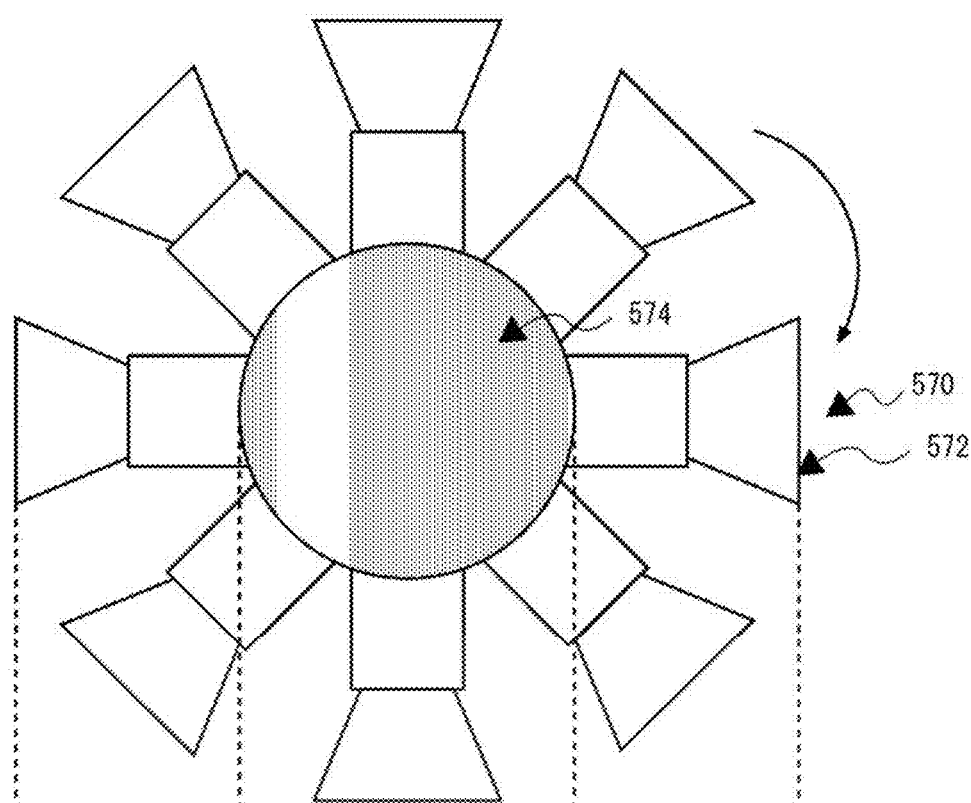
(b)
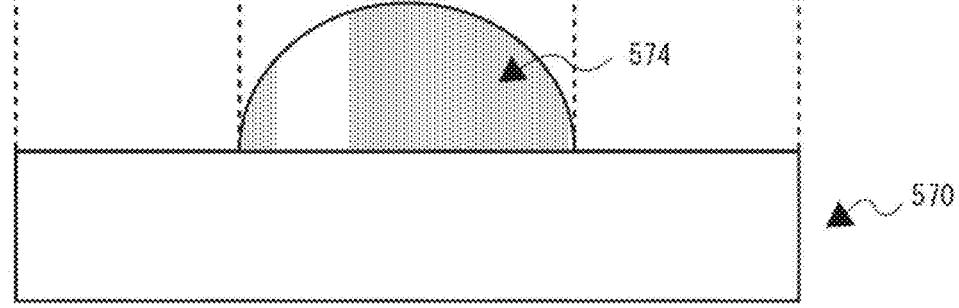

CAMERA SYSTEM 506

CAMERA SYSTEM

TECHNICAL FIELD

The present invention relates to a camera system.

BACKGROUND ART

As a method for obtaining images with parallax (hereinafter also referred to as "parallax images") for stereopsis in a head mounted display or the like, a method is known in which a plurality of cameras are used to capture images of the same subject to generate parallax images. Additionally, a method for rotating one camera to generate parallax images is known.

CITATION LIST

Patent Literature

[PTL 1] Japanese Patent Laid-Open No. 2017-16431

SUMMARY

Technical Problems

However, in a case where a plurality of cameras are used to capture images of the same subject, the plurality of cameras need to be arranged to face the same direction, disadvantageously leading to an increased apparatus size. Additionally, in a case where one camera is rotated to generate parallax images, acquiring parallax of a moving object is disadvantageously difficult.

In view of such problems, an object of the present invention is to provide an improved technique for providing suitable three-dimensional images.

Solution to Problems

To accomplish the object, a camera system according to an aspect of the present invention includes a plurality of cameras configured to simultaneously capture images in different directions, a drive section configured to rotate the plurality of cameras in a predetermined direction, and a parallax acquisition section. The plurality of cameras are configured such that, even during rotation, one of the cameras captures an image of a preset specific region, and the parallax acquisition section acquires parallax information regarding an object present in the specific region on a basis of a plurality of captured images of the specific region.

Another aspect of the present invention is also a camera system. The camera system includes a plurality of cameras configured to simultaneously capture images of an identical subject from different angles, a drive section configured to rotate the plurality of cameras in a predetermined direction to change positions of the plurality of cameras, an orientation detection section configured to detect an orientation of a head mounted display, and a generation section configured to generate an image that the head mounted display is caused to display, on a basis of an image captured by a camera included in the plurality of cameras and located at a position corresponding to the orientation of the head mounted display detected by the orientation detection section.

Note that effective aspects of the present invention also include any combinations of the above-described components and the expression of the present invention converted among an apparatus, a method, a computer program, and a recording medium in which a computer program is readably recorded.

Advantageous Effect of Invention

According to the present invention, provision of suitable three-dimensional images can be assisted.

BRIEF DESCRIPTION OF DRAWINGS

FIG. 26(a) and FIG. 26(b) are diagrams illustrating an arrangement aspect of cameras in a camera system in Modified Example 10.

DESCRIPTION OF EMBODIMENTS

Related Art

Figure 1:
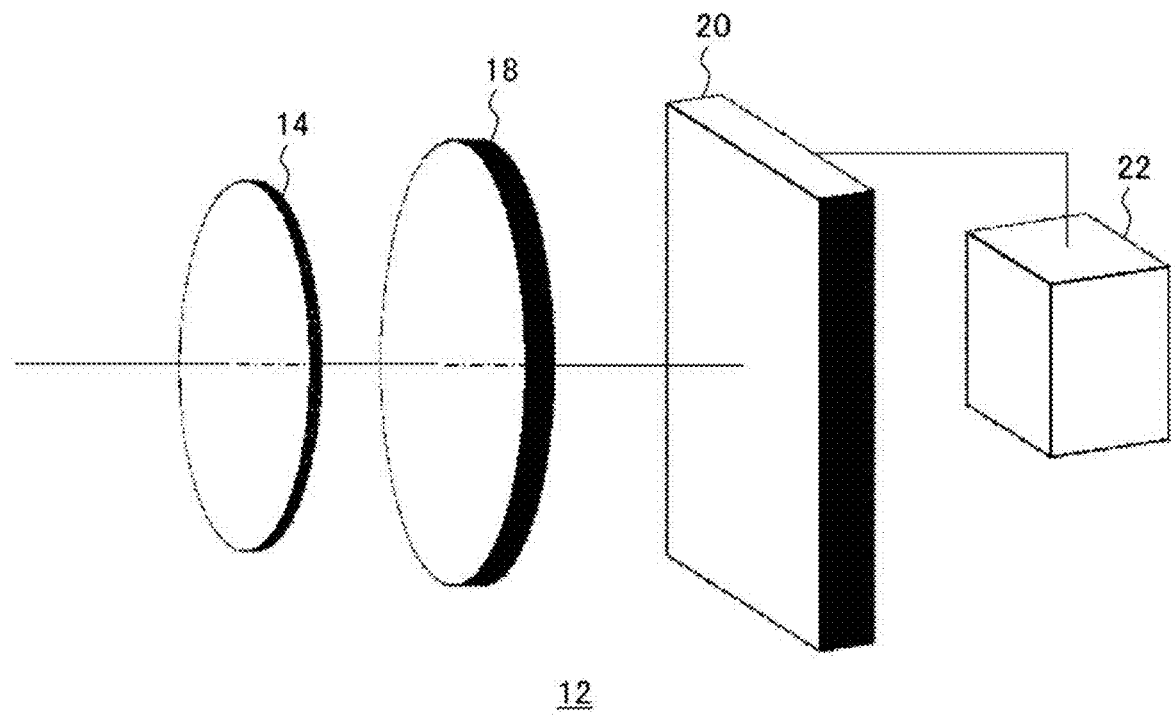
FIG. 1 is a diagram conceptually illustrating a configuration of an image capturing apparatus in the related art.

FIG. 1 is a diagram conceptually illustrating a configuration of an image capturing apparatus according to the present embodiment. An image capturing apparatus 12 includes an image forming optical system 14, a diaphragm 18, an image capturing element 20, and an image processing section 22. The image forming optical system 14 has a general configuration including a focusing lens forming an image of a subject on an image capturing surface of the image capturing element 20. Note that FIG. 1 representatively illustrates one lens. The diaphragm 18 includes an opening and has a general configuration in which a diameter is varied to adjust the amount of incident light.

The image capturing element 20 includes a two-dimensional array of pixels and converts the intensity of incident light into charge and outputs the charge to the image processing section 22. The pixel in the present embodiment has a structure including microlenses, polarizers, and photodiodes that are integrally layered. In this case, a plurality of photodiodes are provided for one microlens to acquire two phase difference images resulting from splitting of incident light. A region corresponding to one microlens is hereinafter designated as one pixel region.

In other words, a plurality of photodiodes are provided for one pixel. Note that the photodiode is a representative example of a mechanism converting the intensity of incident light into charge but that such limitation of the present embodiment is not intended. Specifically, whatever photoelectric conversion mechanism is employed instead of the photodiodes, the present embodiment can be similarly implemented, and one unit of mechanism converting light into charge can be used instead of each photodiode. Additionally, the polarizers may be provided in all pixels or may be discretely provided in some of the pixels.

The image processing section 22 executes image processing using a two-dimensional distribution of the luminance of light output from the image capturing elements 20 to generate a general color image and a distance image representing distances to a subject as pixel values. Note that the image capturing apparatus 12 may further be provided with operation means operated by a user, and a mechanism for performing an image capturing operation, an adjustment operation for image capturing conditions, and the like according to the contents of the operation by the user. Additionally, the image capturing apparatus 12 may include a mechanism for establishing wired or wireless communication with an external information processing apparatus such as a game machine and transmitting generated data and receiving control signals for data transmission request and the like. However, these mechanisms may be similar to corresponding mechanisms in general image capturing apparatuses, and thus description of the mechanisms is omitted.

Figure 2:
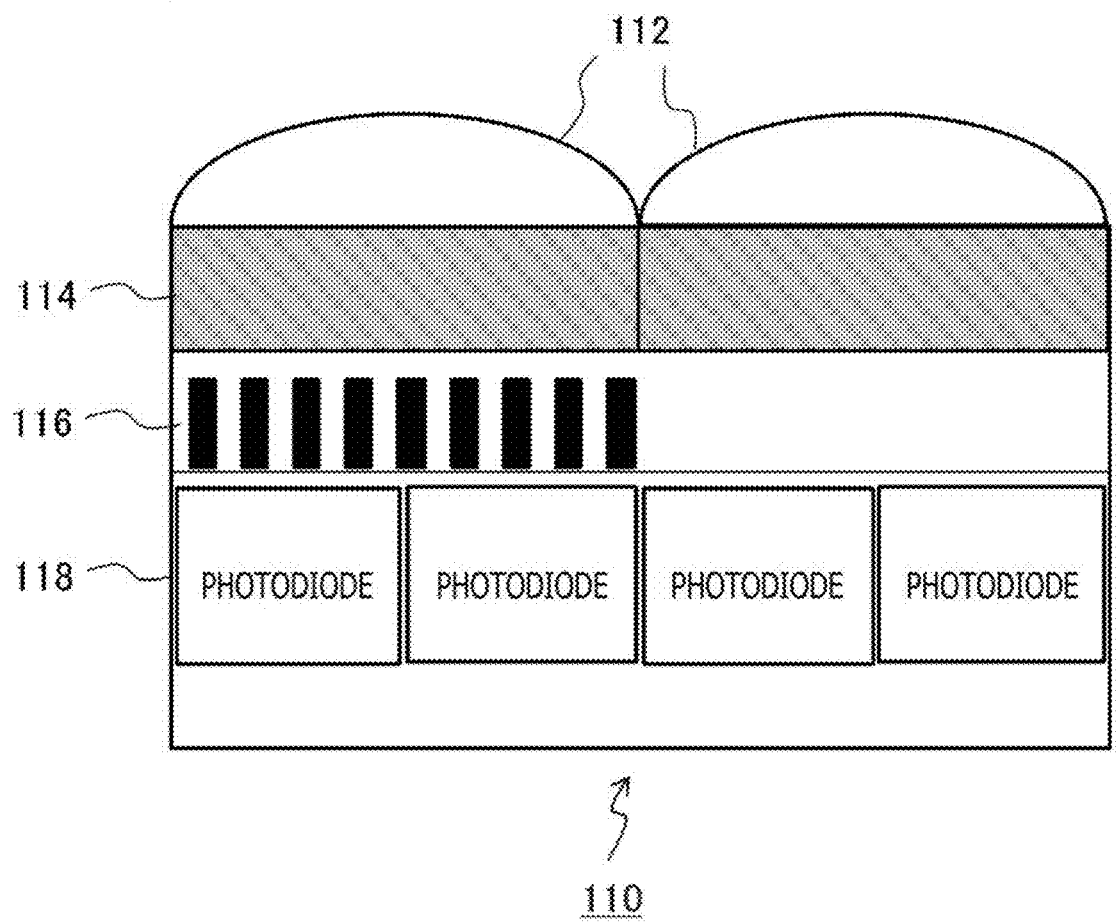
FIG. 2 is a diagram illustrating a structure example of pixels included in the image capturing apparatus in the related art.

FIG. 2 illustrates a structure example of pixels included in the image capturing apparatus 12. Note that FIG. 2 schematically illustrates a functional structure in an element cross section and that a detailed structure including interlayer insulating films, wires, and the like are omitted from FIG. 2. Additionally, FIG. 2 illustrates a sectional structure of two adjacent pixels. A pixel 110 includes a microlens layer 112, a color filter layer 114, a polarizer layer 116, and a photoelectric conversion layer 118. The microlens layer 112 is provided for each pixel to condense light incident via the diaphragm 18.

The color filter layer 114 transmits light in a color varying with the pixel. The polarizer layer 116 includes wire grid polarizers including a plurality of linear conductor members, for example, members (wires) of tungsten, aluminum, or the like arranged in stripes at intervals smaller than the wavelength of incident light. Light condensed by the microlens layer 112 and transmitted through the color filter layer 114 enters the polarizer layer 116, a polarization component in a direction parallel to the line of the polarizers is reflected, while only a polarization component in a direction perpendicular to the line of the polarizers is transmitted.

The transmitted polarization component is converted into charge by the photoelectric conversion layer 118, thus acquiring polarization luminance. An image acquisition technique using the wire grid polarizers as illustrated is disclosed in, for example, Japanese Patent Laid-Open No. 2012-80065. However, the element structure of the image capturing apparatus 12 according to the present embodiment is not limited to the illustrated structure. For example, the polarizer is not limited to the wire grid type but may be any of polarizers that have been put to practical use, such as linear dichroic polarizers. Note that, in FIG. 2, a cross section of the wires extending in a depth direction in the figure is illustrated as the polarizers but that the polarizers have four main axis angles, with the direction of the wire varying with the main axis angle.

Additionally, in the polarizer layer 116, some regions may include the polarizers and the other regions may include no polarizers, depending on the pixel, as illustrated. In the regions including no polarizers, light transmitted through the color filter layer 114 is directly incident on the photoelectric conversion layer 118. The photoelectric conversion layer 118 includes general photodiodes and outputs incident light as charge. As described above, in the present embodiment, a plurality of photodiodes are provided for one microlens to convert light transmitted through different regions of a focusing lens, into the respective pieces of charge.

A technique for detecting focus on the basis of a light phase difference thus detected has been put to practical use as a method for phase difference auto focusing (see, for example, Japanese Patent Laid-Open No. 2013-106194). In the present embodiment, the phase difference is utilized to acquire a distance to a subject. By summing detection values from the plurality of photodiodes provided in one pixel, luminance of one pixel in a general image capturing apparatus is obtained. Specifically, the pixel configuration illustrated in FIG. 2 allows a general color image, a distance image, and a polarization image to be simultaneously obtained.

Figure 3:
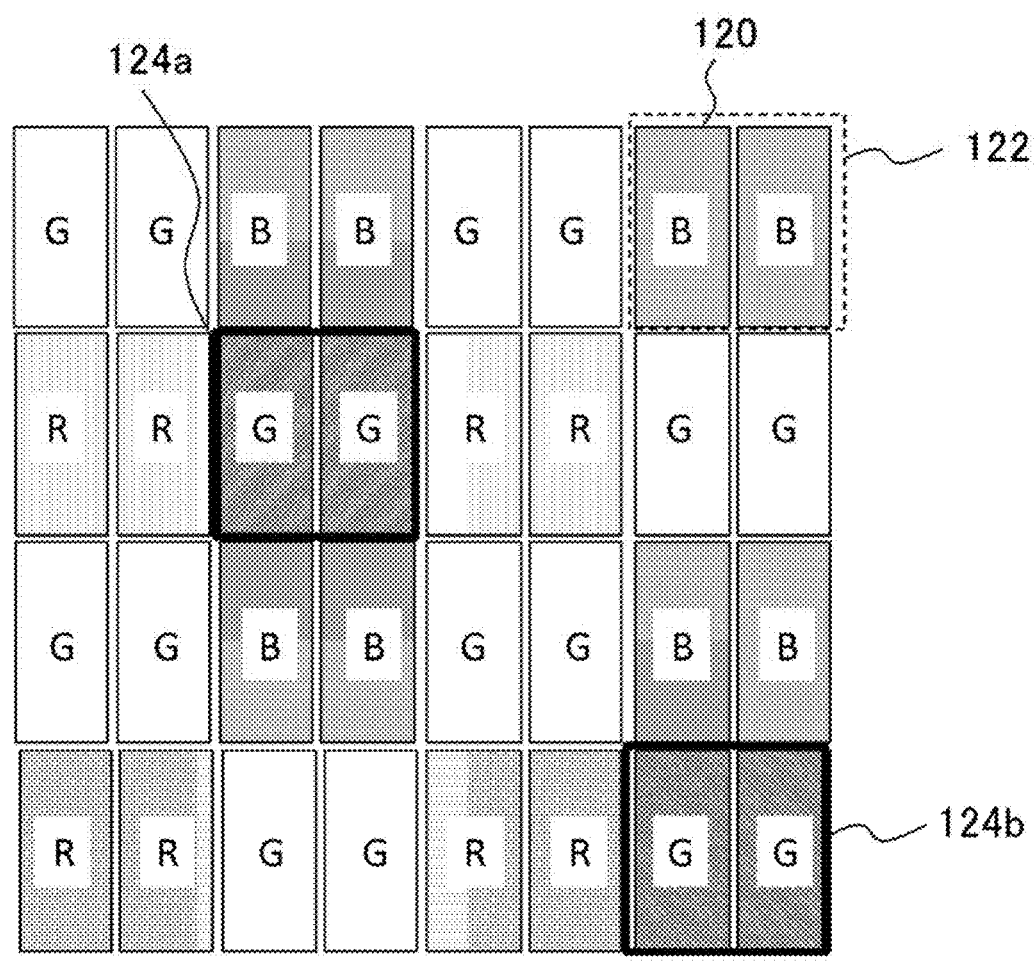
FIG. 3 is a diagram illustrating a pixel array in an image capturing element in the related art.

FIG. 3 illustrates a pixel array in the image capturing element 20. FIG. 3 schematically illustrates a combination of the layers observed when a partial region of the image capturing element 20 is viewed from a top surface, and vertically long rectangles each indicate one photodiode (for example, a photodiode 120). A pair of two lateral photodiodes corresponds to one pixel (for example, a pixel 122). Additionally, the color filters in the color filter layer 114 are in a Bayer array, and each of the pixels detects one of red light, green light, and blue light. In FIG. 3, the pixels are represented by the characters "R," "G," and "B."

Additionally, pixels 124a and 124b indicated by thick frames are provided with polarizers. Thick oblique lines in the pixels 124a and 124b represent wires included in the polarizers. Specifically, the pixels 124a and 124b include polarizers with different main axis angles. FIG. 3 illustrates two types of polarizers with main axis angles orthogonal to each other, and further different pixels are used to provide four types of polarizers with a main axis angle varying in increments of 45°.

Each polarizer transmits a polarization component in a direction orthogonal to the wire direction. Thus, the photodiodes provided in a layer below the polarizers output charge representing the luminance of polarization components in four directions corresponding to increments of 45°. In a case where only the polarization luminance is obtained from the pixels, detection values from two photodiodes provided in one pixel may be summed. In the Bayer array, the pixels allocated to green (G) have the highest density, and thus in this example, pixels provided with the polarizers are green pixels.

Thus, the pixels provided with the polarizers can be located relatively proximate to one another, allowing the polarization luminance of the same color in a plurality of orientations to be obtained at a high resolution. The polarization luminance is separated into pieces corresponding to the polarization orientations, and the pieces are interpolated to obtain polarization images in four directions. The polarization images can be utilized to determine normal vectors of subject surfaces. The normal vectors represent the inclinations of very small areas on each of the subject surfaces, and the use of the normal vectors allows interpolation of distance values at feature points acquired on the basis of a phase difference. The distance values based on the phase difference and the normal vectors are simultaneously obtained from a captured image with the same viewpoint obtained by the same image capturing apparatus 12, thus allowing accurate interpolation to be achieved without a need for alignment or the like.

Note that, in a case where no color image is used for image display or the like, the color filter layer 114 may be omitted from the pixel 110. In this case, a luminance image, a distance image, and a normal image can be obtained. Alternatively, the color filters may be dye-based filters for dyes in cyan, magenta, and the like. Additionally, the array illustrated in FIG. 3 is only illustrative, and limitation of the pixel array in the present embodiment to this array is not intended. For example, the pixels provided with the polarizers may have an increased density, and all the pixels may be provided with the polarizers.

Figure 4:
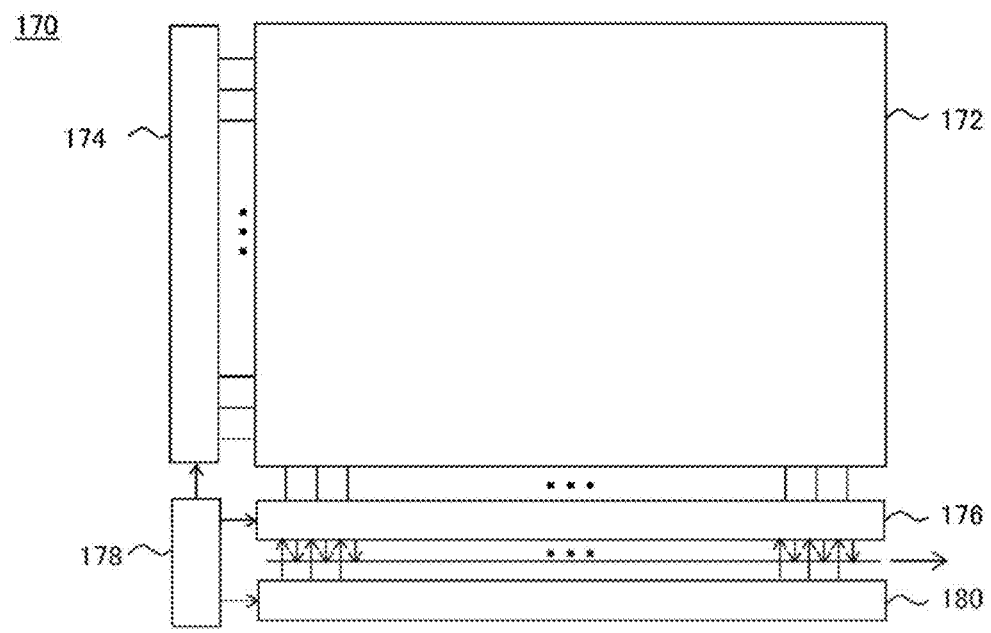
FIG. 4 is a diagram schematically illustrating a structure of an image sensor in the related art.

FIG. 4 schematically illustrates a structure of an image sensor according to the present embodiment. An image sensor 170 includes a pixel section 172 and also includes, as peripheral circuits, a row scanning section 174, a horizontal selection section 176, a column scanning section 180, and a control section 178. The pixel section 172 includes pixels arranged in a matrix as illustrated in FIG. 2.

For the photodiodes in the photoelectric conversion layer 118, each row of the photodiodes is connected to the row scanning section 174, each column of the photodiodes is connected to the horizontal selection section 176 and the column scanning section 180. The row scanning section 174 includes a shift register, an address decoder, and the like and drives the pixels in units of rows. Signals output from the pixels selected and scanned by the row scanning section 174 are fed to the horizontal selection section 176. The horizontal selection section 176 includes an amplifier, horizontal selection switches, and the like.

The column scanning section 180 includes a shift register, an address decoder, or the like and operates the horizontal selection switches of the horizontal selection section 176 while performing sequential driving. The column scanning section 180 performs selection and scanning to output, to the outside, signals fed from the pixels to the horizontal selection section 176. The control section 178 generates timing signals to control drive timings for the horizontal selection section 176, the column scanning section 180, and the like.

In a certain aspect of the present embodiment, some pixels include the polarizers while the others include no polarizers. In this case, the pixels including the polarizers reflect a fraction of incident light to make the intensity of light reaching the photodiodes lower than the pixels including no polarizers. Additionally, the pixels including the polarizers provide more information than the pixels including no polarizers. In consideration of these, the peripheral circuits as illustrated may each be divided into two portions depending on the presence of the polarizers to allow independent control of data reading timings or intervals.

For example, for the pixels including the polarizers, a frame rate is reduced to make a charge accumulation time longer than that in the other pixels, allowing luminance at the same level to be obtained all over an image plane. This allows the entire image to be uniformly treated regardless of the presence of the polarizers. Alternatively, conversely, the frame rate of the pixels including the polarizers may be increased. In this case, by using a luminance distribution of polarized light output at a high rate to determine the distribution of normal vectors at a high frequency, detection sensitivity for movement of a surface of the subject can be increased. How to control the data reading timings may be determined according to the contents of subsequent processing or the required detection sensitivity.

Figure 5:
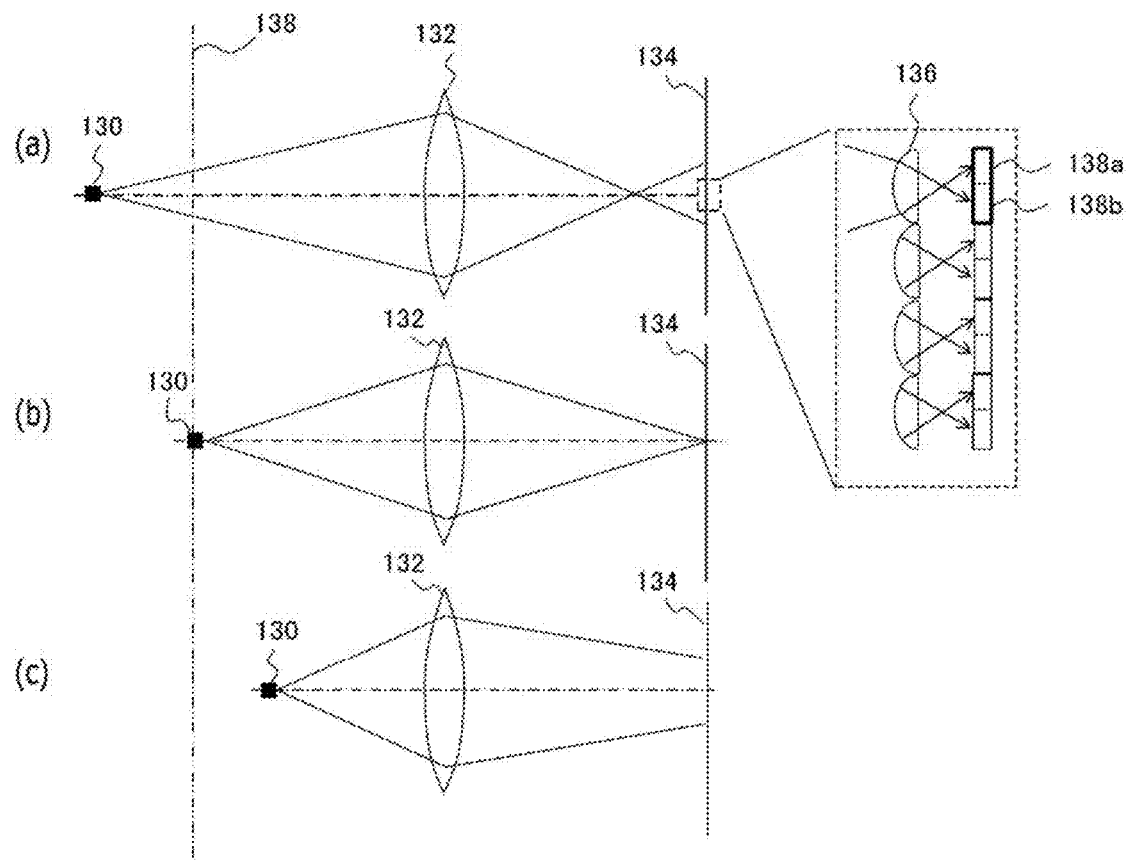
FIG. 5 is a diagram for describing the principle of acquisition of distance information based on a phase difference in the related art.

FIG. 5 is a diagram for describing the principle of acquisition of distance information based on the phase difference. FIG. 5 illustrates a path through which light from a subject 130 enters an image capturing surface 134 of the image capturing element 20 via a focusing lens 132 of the image forming optical system 14, as viewed from above an image capturing space. It is assumed that states (a), (b), and (c) involve different distances from the image capturing surface 134 to the subject 130 and that the subject 130 in the state (b) is located at a focus position, that is, on a focus plane 138.

In other words, in the state (b), light emitted from one point on the subject 130 is formed into an image at one point on the image capturing surface 134, as illustrated. Accordingly, one point on the subject 130 corresponds to one pixel, and even in a case where one pixel is provided with two photodiodes, a luminous flux detected by the photodiodes is obtained from substantially the same point on the subject 130. On the other hand, in a case where the subject 130 is located behind the focus plane 138 as in the state (a) or in front of the focus plane 138 as in the state (c), the position where light is formed into an image is misaligned with the image capturing surface 134.

As a result, the pixel receiving a luminous flux having passed through the focusing lens 132 varies depending on which of two regions the luminous flux passes through; the focusing lens 132 is laterally (vertically in FIG. 5) divided into the two regions. As illustrated in a right enlarged view in FIG. 5, after being transmitted through a microlens 136, light from an upper side in FIG. 5 is detected via a photodiode 138b on a lower side in FIG. 5, whereas light from the lower side in FIG. 5 is detected via a photodiode 138a on the upper side in FIG. 5. Subsequently, of the pair of photodiodes, the left-side photodiode as viewed from the image capturing surface (for example, the photodiode 138a) is referred to as a left photodiode, and the right-side photodiode as viewed from the image capturing surface (for example, the photodiode 138b) is referred to as a right photodiode.

As a result, a difference corresponding to the difference in the pixel receiving the luminous flux occurs between an image formed by extracting only the luminance detected by the left photodiode in each pixel and an image formed by extracting only the luminance detected by the right photodiode in the pixel. The amount of the difference depends on a distance from the subject 130 to the focus plane 138. Additionally, the direction of the difference is reversed depending on whether the subject 130 is closer to or farther from the image capturing surface 134 than the focus plane 138. Two images having, as pixel values, the luminance detected by the left photodiode and the right photodiode are hereinafter referred to as "phase difference images," and the amount of difference in the image of the same subject between the phase difference images is hereinafter referred to as a "phase difference."

Figure 6:
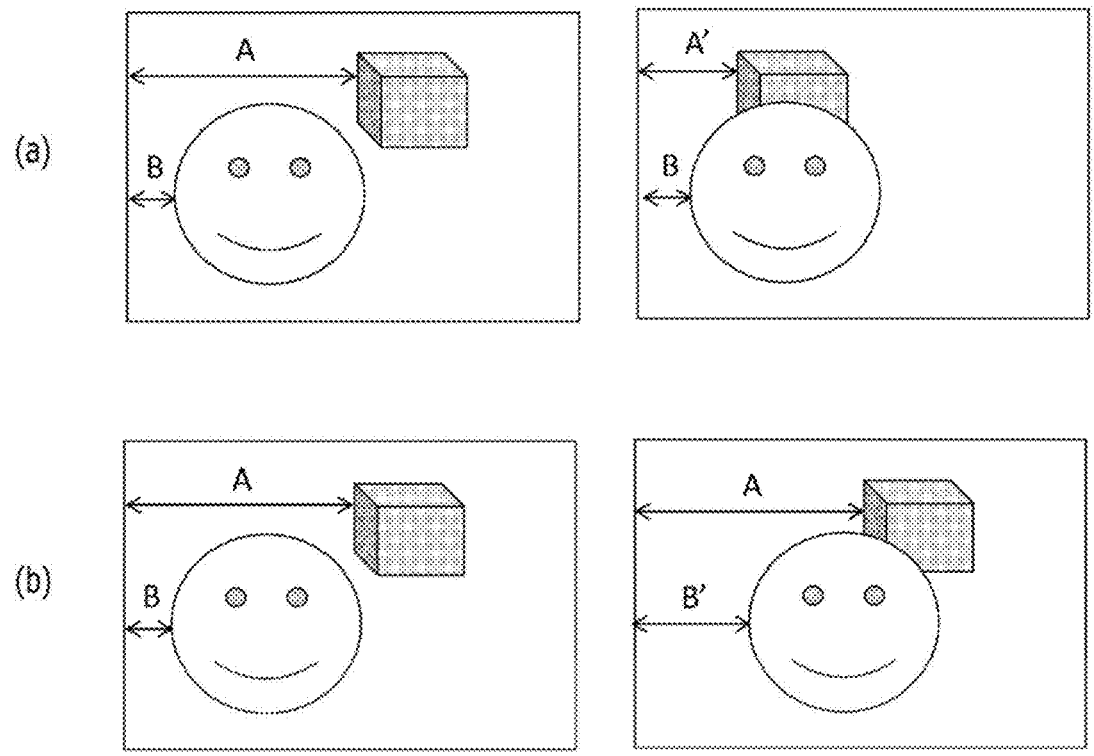
FIG. 6 is a diagram for describing a relation between images and a focal length acquired in the related art.

FIG. 6 is a diagram for describing a relation between images and a focal length acquired according to the present embodiment. FIG. 6 schematically illustrates phase difference images obtained when images of a space in which a face and a cube are present are captured. Of the left and right images, the left image is detected by the left photodiode whereas the right image is detected by the right photodiode. In FIG. 6, (a) illustrates a case where the face is in focus. In this case, the image of the face is at a distance B from a left end in both phase difference images, leading to no phase difference. On the other hand, the image of the cube involves a phase difference of (A'–A). (b) is a case where the cube is in focus. In this case, the image of the cube is at a distance A from the left end in both phase difference images, leading to no phase difference. On the other hand, the image of the face involves a phase difference of B'–B.

Figure 7:
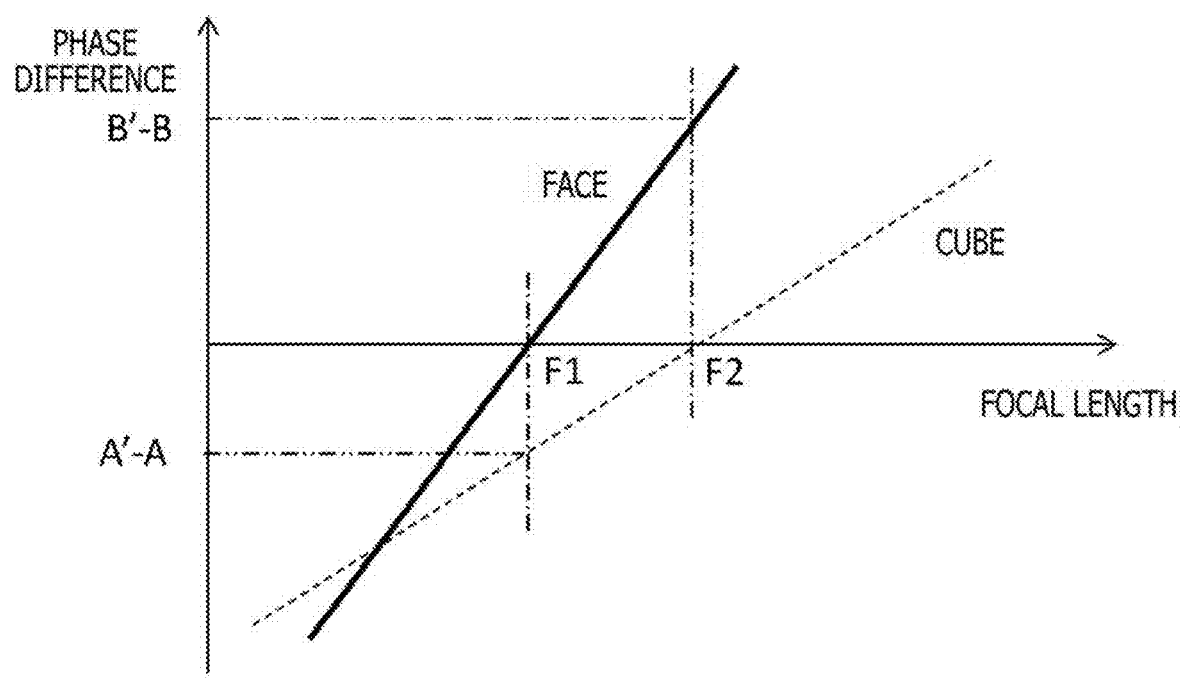
FIG. 7 is a diagram schematically illustrating a relation between the focal length and the phase difference in the case in FIG. 7.

As described above, the direction of the difference is reversed depending on whether the subject is closer or farther than the focal length, and thus the phase difference may take a negative value. FIG. 7 schematically illustrates a relation between the focal length and the phase difference in the case in FIG. 6. A solid line in FIG. 7 indicates the phase difference of the face and a dashed line in FIG. 7 indicates the phase difference of the cube, as variations with respect to the focal length. However, in actuality, the characteristics of the phase difference are not limited to the illustrated characteristics due to various factors of the optical system. When the focal length is F1, the phase difference of the face is 0 as illustrated in FIG. 6(a), and the phase difference A'–A occurs in the cube. When the focal length is F2, the phase difference of the cube is 0 as illustrated in FIG. 6(b), and the phase difference B'–B occurs in the face.

Specifically, when the distance to the subject has a fixed value, the phase difference is uniquely determined by the focal length. In other words, the distance to the subject can be identified by determining the focal length and the phase difference. The focal length can be acquired as is the case with a focusing function in general image capturing apparatuses. Additionally, the relation between the phase difference and the distance from the focal length (focus plane) to the subject is experimentally determined from an actually captured image of a subject located at a known distance and prepared in the form of a table. Accordingly, the distance from the image capturing surface to the subject can be calculated by determining the distance from the focus plane on the basis of the observed phase difference and further adding the focal length to the distance.

Now, a method for obtaining normal vectors from a polarization image will be described. Studies have been conducted on a technique for acquiring various types of information regarding a subject utilizing images of polarization components in a plurality of directions. A method for determining normal vectors of subject surfaces is disclosed in, for example, Gary Atkinson and Edwin R. Hancock, "Recovery of Surface Orientation from Diffuse Polarization," IEEE Transactions on Image Processing, June 2006, 15(6), pp. 1653-1664, Japanese Patent Laid-Open No. 2009-58533, and the like, and those methods may be appropriately employed for the present embodiment. The method for obtaining normal vectors from a polarization image will be described below in brief.

First, the luminance of light observed via the polarizer varies according to a main axis angle $\theta_{pol}$ of the polarizer as indicated by the following equation.

[Math. 1]

$$I = \frac{I_{max} + I_{min}}{2} + \frac{I_{max} - I_{min}}{2}\cos(2(\theta_{pol} - \phi)) \quad \text{(Equation 1)}$$

Here, $I_{max}$ and $I_{min}$ are a maximum value and a minimum value of observed luminance, respectively, and $\Phi$ is a polarization phase. In a case where polarization images are acquired for the four main axis angles $\theta_{pol}$ as described above, the luminance I of the pixel at the same position satisfies Equation 1 for each main axis angle $\theta_{pol}$. Accordingly, $I_{max}$, $I_{min}$, and $\Phi$ can be determined by using the least squares method or the like to allow a curve passing through coordinates (I, $\theta_{pol}$) of the pixels to approximate a cosine function. The thus determined $I_{max}$ and $I_{min}$ are used to determine a degree of polarization $\rho$ in accordance with the equation below.

[Math. 2]

$$\rho = \frac{I_{max} - I_{min}}{I_{max} + I_{min}} \quad \text{(Equation 2)}$$

A normal of an object surface can be expressed by an azimuth $\alpha$ representing an angle of a light incident surface (exit surface in the case of diffuse reflection) and a zenith angle $\theta$ representing an angle on the incident surface. Additionally, according to a dichromatic reflection model, a spectrum of reflected light is represented by a linear sum of spectra of specular reflection and diffuse reflection. Here, the specular reflection is light regularly reflected by the surface of an object, and diffuse reflection is light scattered by pigment particles included in the object. The above-described azimuth α is, in the case of specular reflection, the main axis angle providing the minimum luminance $I_{min}$ in Equation 1, and in the case of diffuse reflection, the main axis angle providing the maximum luminance $I_{max}$ in Equation 1.

The zenith angle θ has the following relations with the degree of polarization $\rho_s$ in the case of specular reflection and with the degree of polarization pa in the case of diffuse reflection.

[Math. 3]

$$\rho_s = \frac{2\sin^2\theta\cos\theta\sqrt{n^2 - \sin^2\theta}}{n^2 - \sin^2\theta - n^2\sin^2\theta + 2\sin^4\theta}$$

$$\rho_d = \frac{(n - 1/n)^2\sin^2\theta}{2 + 2n^2 - (n + 1/n)^2\sin^2\theta + 4\cos\theta\sqrt{n^2 - \sin^2\theta}}$$

(Equation 3)

Here, n is a reflectance of an object. By substituting, into one of $\rho_s$ and $\rho_d$ in Equation 3, of the degree of polarization p obtained by Equation 2, the zenith angle θ is obtained. The resultant azimuth α and zenith angle θ are used to obtain a normal vector ($\rho_x$, $\rho_y$, $\rho_z$) as follows.

[Math. 4]

$$\begin{pmatrix} p_x \\ p_y \\ p_z \end{pmatrix} = \begin{pmatrix} \cos\alpha\cos\theta \\ \sin\alpha\cos\theta \\ \sin\theta \end{pmatrix}$$

(Equation 4)

As described above, on the basis of the relation between the luminance I provided by each pixel in the polarization image and the main axis angle $\theta_{pol}$ of the polarizer, the normal vector of the object in the pixel is determined, allowing the distribution of normal vectors in the entire image to be obtained. For example, in an aspect in which the object can be limited to, for example, a game controller, the normal can be more accurately determined by employing an appropriate model for one of specular reflection and diffuse reflection on the basis of the color and material of the object. On the other hand, various methods for separating specular reflection and diffuse reflection from each other have been proposed, and thus such a technique may be applied to more rigorously determine normals.

Figure 8:
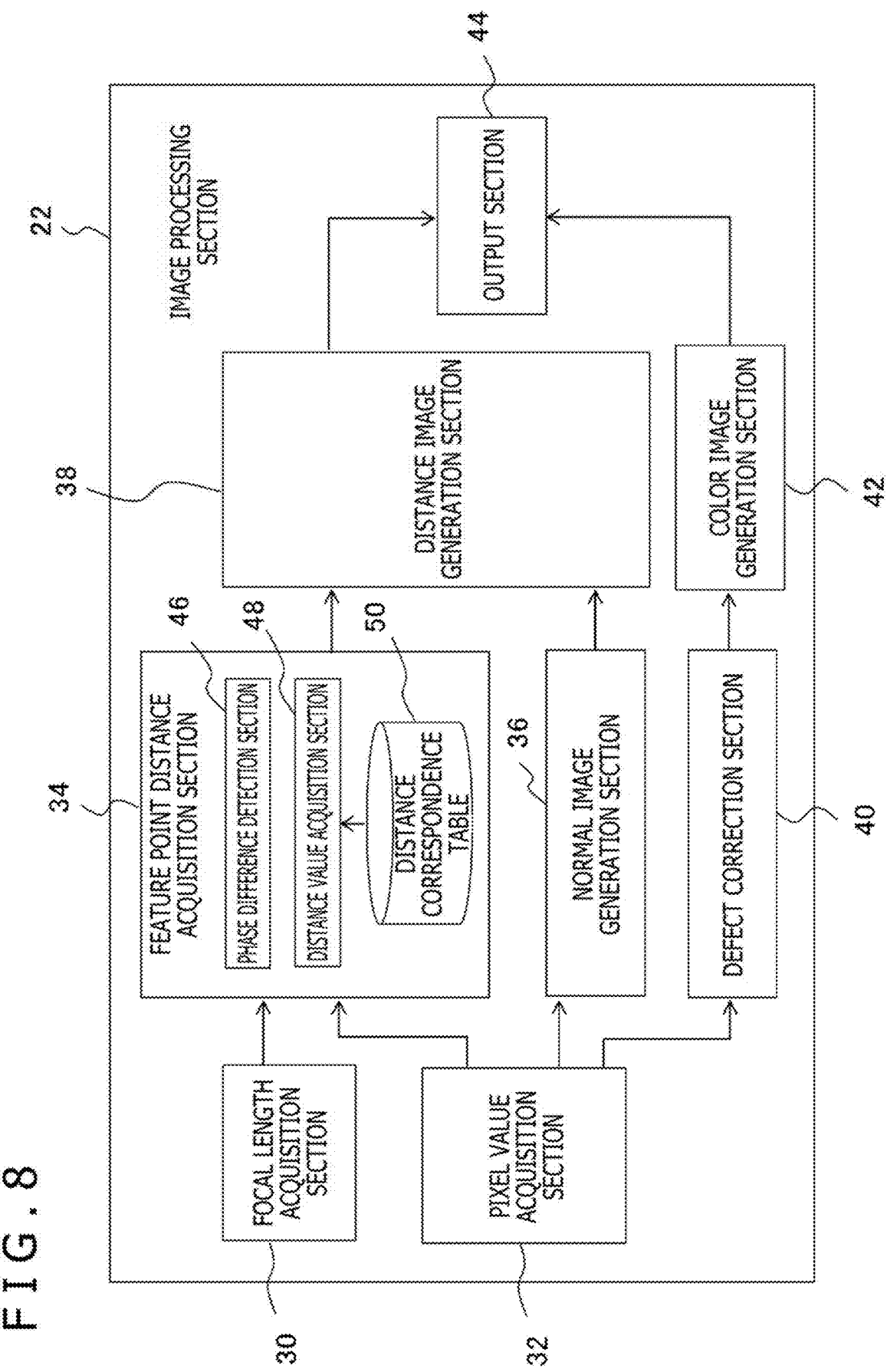
FIG. 8 is a diagram illustrating functional blocks of an image processing section in the related art.

FIG. 8 illustrates functional blocks of the image processing section 22 according to the present embodiment. The functional blocks illustrated in FIG. 8 and FIGS. 17 and 20 described below can be implemented using, in terms of hardware, an image capturing element, various arithmetic circuits, a microprocessor, a buffer memory, or the like or using, in terms of software, a program stored in the memory. Accordingly, a person skilled in the art could understand that the functional blocks can be implemented in various forms using only hardware, only software, or a combination of the hardware and the software, and limitation to one of the hardware and the software is not intended.

The image processing section 22 includes a pixel value acquisition section 32 configured to acquire two-dimensional data regarding luminance from the image capturing element 20 and execute predetermined preprocessing, a focal length acquisition section 30 configured to acquire the actual focal length, a feature point distance acquisition section 34 configured to generate a distance image on the basis of the phase difference, a normal image generation section 36 configured to generate a normal image from polarization luminance in a plurality of orientations, a distance image generation section 38 configured to use normal vectors to supplement distance values based on the phase difference to generate a distance image, a defect correction section 40 configured to correct defects in pixel values, a color image generation section 42 configured to generate a color image by demosaic processing, and an output section 44 configured to output distance image data and the color image data.

The pixel value acquisition section 32 acquires, as two-dimensional data, a luminance signal detected by the image capturing element 20, and executes predetermined preprocessing such as an A/D (Analog/Digital) conversion or clamp processing on the luminance signal. The focal length acquisition section 30 reads, from the memory, the focal length acquired by a focusing function included in the image capturing apparatus 2 and not illustrated. In an environment in which the focal length is adjustable, the data is read each time the focal length changes. For an apparatus with a fixed focal length, a set value for the focal length is initially acquired.

The feature point distance acquisition section 34 includes a phase difference detection section 46, a distance value acquisition section 48, and a distance correspondence table 50. The phase difference detection section 46 separates pixel values detected by the left photodiode and the right photodiode from pixel values acquired by the pixel value acquisition section 32, to generate phase difference images. In this case, all the pixels remaining in the Bayer array may be to be processed or for example, only green pixels may be to be processed. Then, by extracting feature points from both phase difference images, and identifying positions representing the same feature point in the subject, the phase difference is acquired for each feature point.

The distance correspondence table 50 stores a distance correspondence table in which a distance from the focus plane is associated with the phase difference. The distance value acquisition section 48 references the distance correspondence table on the basis of the phase difference acquired by the phase difference detection section 46 to acquire a distance value corresponding to the phase difference. The distance value is added to the focal length acquired from the focal length acquisition section 30 to acquire an absolute value of the distance from the image capturing surface for each feature point.

The normal image generation section 36 extracts the values for the pixels provided with the polarizers from the pixel values acquired by the pixel value acquisition section 32, and further executes separation and interpolation for each of the main axis angles of the polarizers, to generate polarization images in a plurality of orientations. In this case, detection values from the two photodiodes provided in one pixel are summed to obtain one pixel value. Additionally, the polarization luminance in each orientation is interpolated to acquire polarization luminance in a plurality of orientations for the same position coordinates on the image plane. Then, on the basis of variation in polarization luminance according to the orientation, the normal vectors are calculated using Equations 1 to 4.

The normal image generation section 36 generates a normal image having, as each pixel value, three elements of the normal vector obtained for each pixel. The image can basically have the same resolution as that of the captured image. On the other hand, depending on the resolution required for the normal vectors and a distance image in a succeeding step, the normal image may be generated at a lower resolution than the captured image.

The distance image generation section 38 uses the normal image generated by the normal image generation section 36 to supplement the distance value for each feature point generated by the feature point distance acquisition section 34, thus generating a distance image representing the distance to the subject surface as a pixel value. That is, the feature point distance acquisition section 34 can acquire distance values for feature points such as a contour of an image of a subject and a pattern on the surface of the subject for which the phase difference can be determined, but has difficulty calculating distances to regions such as monochromatic smooth object surfaces which are difficult to extract feature points from.

On the other hand, the normal image generation section 36 can acquire an inclination of the object surface for each very small area in detail. Accordingly, by using, as a start point, the distance value for the feature point acquired by the feature point distance acquisition section 34 and sequentially providing inclinations based on the normal vectors acquired by the normal image generation section 36, distances can be determined at a resolution similar to the resolution at which the normal vectors are obtained. The defect correction section 40 correct pixel values of the pixels provided with the polarizers which values are included in the pixel values acquired by the pixel value acquisition section 32.

The pixel with the polarizers reflects the polarization component in the same orientation as that of the main axis angle of the polarizers, and thus light reaching the photodiodes has a lower intensity than light incident on the image capturing surface. Accordingly, the luminance of the pixel is corrected to a level equivalent to the level of surrounding pixels to prevent some of the pixels in the color image from becoming black spots. Correction processing may involve interpolation using the pixel values of the surrounding pixels or preliminarily determining a rate of decrease in the amount of light due to the polarizer by experiment or the like and multiplying the pixel value by a constant based on the rate. Note that also the defect correction section 40 sums the detection values from the pair of photodiodes and uses the sum as one pixel value.

The color image generation section 42 executes demosaic processing on an image resulting from the defect correction to generate a color image in which one pixel has values for three color elements. Specifically, by interpolating, for each color, the pixel values obtained in the Bayer array as illustrated in FIG. 3, all the pixels are each provided with three elements. A general demosaic method is applicable to this processing. The output section 44 acquires at least distance image data generated by the distance image generation section 38 and color image data generated by the color image generation section 42, and sequentially transmits the data to an external apparatus.

Alternatively, the output section 44 may temporarily store the data in the memory, a recording medium, or the like and transmit the data to the external apparatus at an appropriate timing according to a user operation or the like, or the user can carry out the data. In the present embodiment, color images and distance images can be simultaneously acquired at similar resolutions and can thus be used to accurately execute various types of information processing. For example, the position of the subject in a three-dimensional space is determined along with the color of the subject, and thus the position and the color can be temporarily arranged in a virtual space, and a display image can be reconfigured according to the viewpoint of the user wearing a head mounted display. In this case, by generating an image for a left viewpoint and an image for a right viewpoint and displaying the images in left and right regions resulting from division of a display screen of the head mounted display into two portions, virtual reality or augmented reality can be realized.

Note that the output section 44 may further output the normal image generated by the normal image generation section 36. Information regarding the normal represents changes in the orientation of the subject at a resolution higher than that of the image of the subject itself and can thus be used for motion detection. Note that, in a case where the image processing section 22 of the image capturing apparatus 12 can generate a distance image along with a color image as illustrated, loads on an information processing apparatus that executes various types of processing using the distance image can be kept low to keep the power consumption of the information processing apparatus low.

On the other hand, at least one of the distance image generation section 38, the feature point distance acquisition section 34, and the normal image generation section 36 may be provided in an information processing apparatus other than the image capturing apparatus 12. Alternatively, a logic circuit including at least some of the illustrated functions may be provided in a layer below the pixel array to form a layered image sensor. Accordingly, many types of image processing are completed within the image sensor, enabling an increase in the speed of processing and reducing loads on the subsequent processing to eliminate a need to provide a large calculator.

Figure 9:
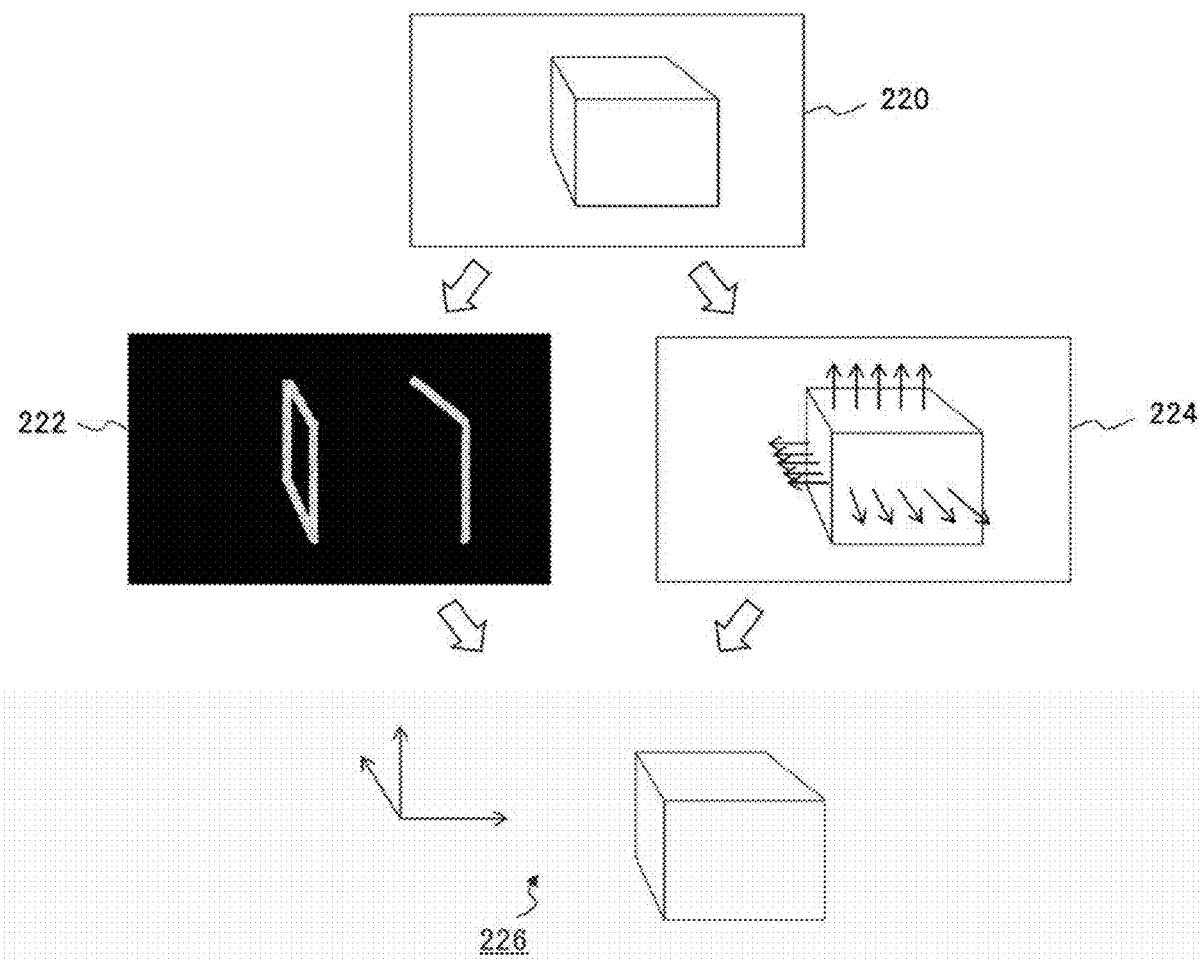
FIG. 9 is a diagram schematically illustrating transition of a captured image in the image processing section in the related art.

FIG. 9 schematically illustrates a transition of a captured image in the image processing section 22. First, the pixel value acquisition section 32 acquires data of a captured image such as an image 220. In the illustrated example, a subject in the image is a cube. The data acquired includes information regarding the luminance of natural light or polarized light detected by the left photodiode and the right photodiode. The feature point distance acquisition section 34 acquires a phase difference for each feature point as described above, and on the basis of the phase difference and the focal length, generates data 222 regarding the distance value for the feature point.

The illustrated data 222 is represented in the form of a distance image in which smaller distance values indicate higher luminance and in which regions from which no distance value can be obtained are assigned the minimum luminance. In this case, edge portions of the cube as a subject that have a high luminance gradient are extracted as feature points, and the distance value can be obtained for portions of the phase difference images for which the phase difference is determined. As illustrated in FIG. 3, in a case where a pair of photodiodes is arranged in a lateral direction in the region of one pixel, the phase difference appears in the horizontal direction of the image plane. Thus, as illustrated in the data 222, for edges in the horizontal direction, no accurate phase difference can be identified and the distance value is indefinite.

On the other hand, the normal image generation section 36 uses polarization images in a plurality of orientations to generate a normal image 224. FIG. 9 illustrates a part of the distribution of the normal vectors on the surfaces of the cube by arrows. However, in actuality, the normal vectors can be determined in units of pixels. The distance image generation section 38 uses, as a start point, the distance of each of the edge portions obtained in the data 222 regarding the distance values based on the phase difference to apply, in units of pixels, the inclinations of the surfaces based on the normal vectors. This results in the determination that the portions between the edges in the data 222 are planes and the determination of the distance values for the surfaces including the edge portions in the horizontal direction for which no distance value has been obtained.

Accordingly, for visible portions of the surfaces of the cube in the captured image, position information 226 in a world coordinate system can be acquired. The distance image generation section 38 may generate information regarding position coordinates of the surfaces of the subject in such a three-dimensional space or generate a distance image with distance values indicated on the image plane.

Figure 10:
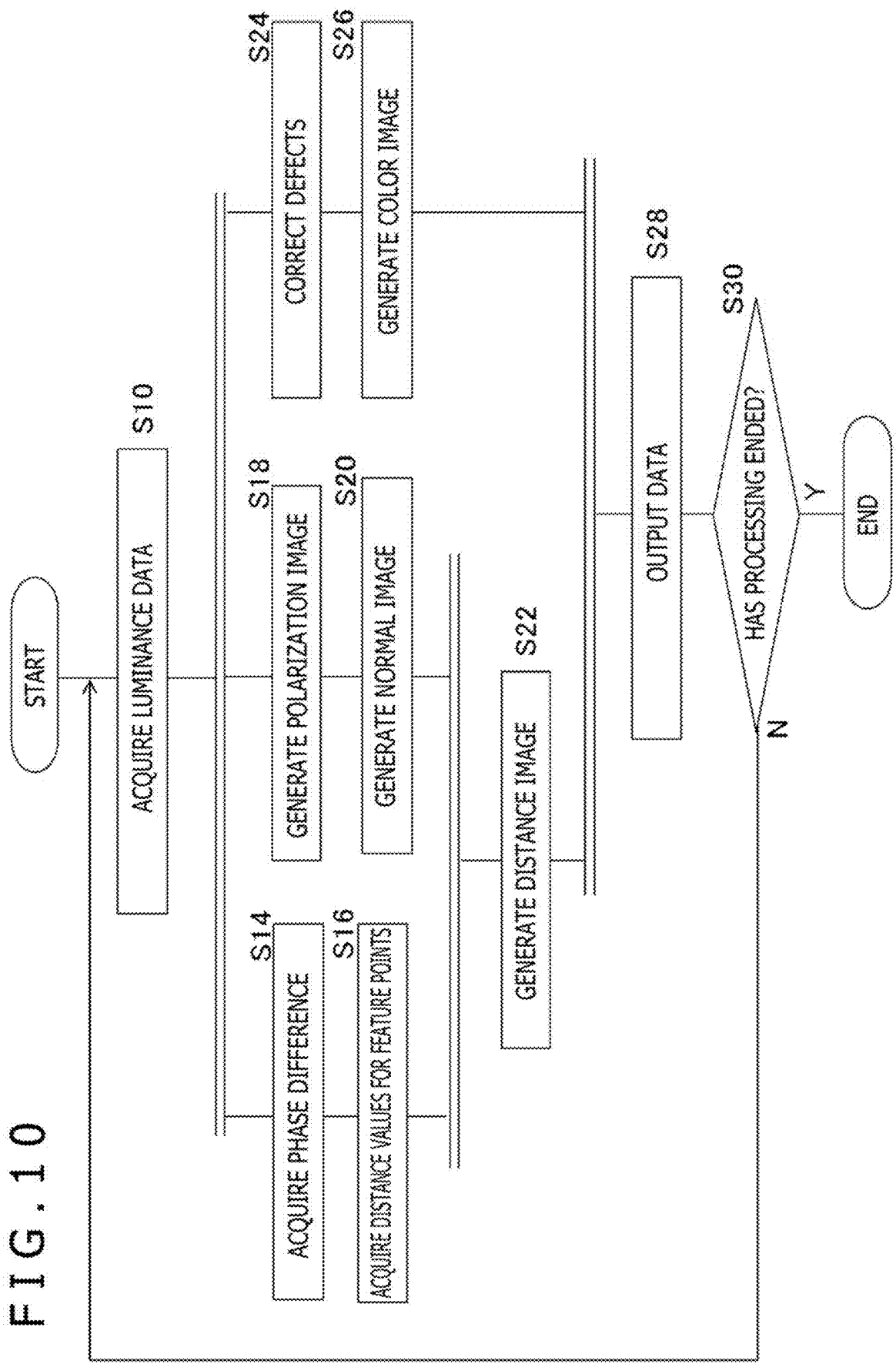
FIG. 10 is a flowchart illustrating a process procedure in which the image processing section in the related art generates various data from a captured image and outputs the data.

Now, operations of the image processing section 22 that can be achieved by the above-described components will be described. FIG. 10 is a flowchart illustrating a processing procedure in which the image processing section 22 according to the present embodiment generates various data from a captured image and outputs the data. First, the pixel value acquisition section 32 acquires, from the image capturing element 20, data regarding the luminance detected by the photodiodes (S10). The luminance data obtained is fed to the feature point distance acquisition section 34, the normal image generation section 36, and the defect correction section 40.

The feature point distance acquisition section 34 separates the luminance detected by the left photodiode and the right photodiode to generate phase difference images, and associates feature points with one another to acquire a phase difference (S14). Then, on the basis of the phase difference and the focal length, the distance value for the pixel forming each feature point is identified (S16). The normal image generation section 36 extracts the values for the pixels for which polarized light has been detected, and separates and interpolates the values for the pixels for each of the main axis angles of the polarizer to generate polarization images in a plurality of orientations (S18). Then, the orientation dependence of the polarization luminance at the same position is acquired to calculate normal vectors for each pixel or in larger units to generate a normal image (S20).

The distance image generation section 38 uses the normal image to determine distance values for portions where no distance value can be determined on the basis of the phase difference, to generate a distance image with the distance values supplemented (S22). On the other hand, the defect correction section 40 performs defect correction to amplify the luminance level of the pixels for which polarized light has been detected to the same level as that of the other pixels (S24). The color image generation section 42 executes demosaic processing on an image of the corrected Bayer array to generate a color image (S26).

The output section 44 sequentially outputs color image data and distance image data to the external apparatus or the memory (S28). At this time, normal image data may be output at the same time. An output target may be switched according to a request from the output destination apparatus. In a case where ending image capturing or data output in response to a user operation or the like is not needed, the processing from S10 to S28 is repeated in units of image frames (N in S30). In a case where the processing needs to be ended, all of the processing is ended (Y in S30).

Note that, when the distance image generation section 38 generates a distance image in S22, distance images generated for a predetermined number of a plurality of image frames may be accumulated and averaged, and the averaged data may be output at time intervals corresponding to the plurality of image frames as the distance image at that point of time. This enables a reduction in the rate of noise components included in the distance image generated from one image frame, allowing an accurate distance image to be output. For the number of frames for which distance images are accumulated, an optimum value is determined by experiment or the like in view of the required accuracy, a time resolution, and the like. Alternatively, the number of frames may be adaptively varied according to the luminance level of the actual captured image or the like.

Figure 11:
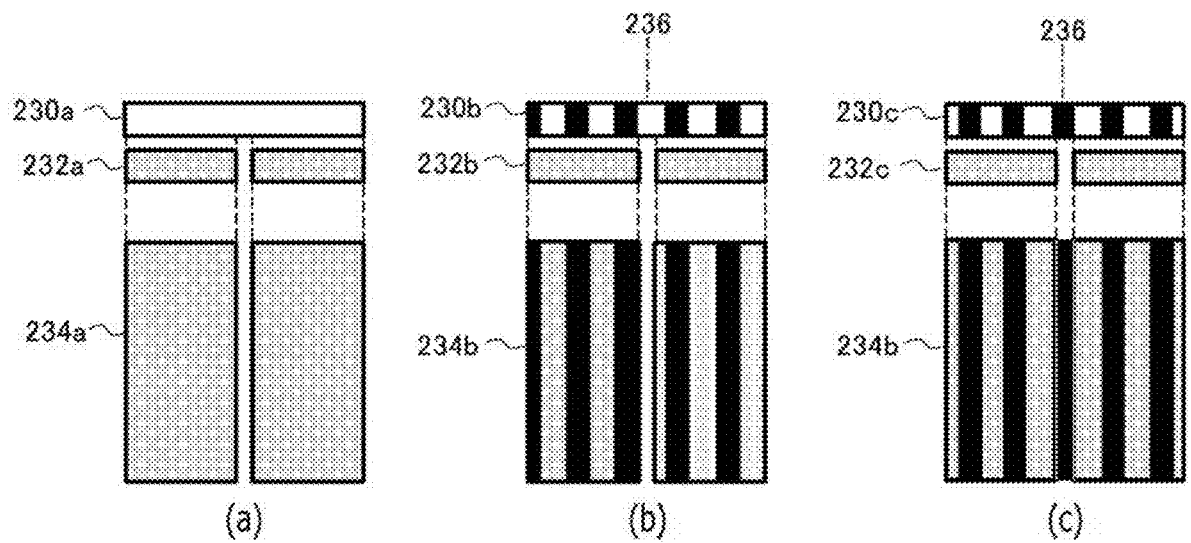
FIG. 11 is a diagram illustrating a positional relation between polarizers and photodiodes in the related art.

The image capturing element according to the present embodiment has a structure in which the polarizers are provided in a layer above the pair of photodiodes. A prerequisite for accurate determination of the phase difference is that the photodiodes of the pair have detected an equivalent luminance level. However, the balance of the luminance level may be lost depending on the layout of the polarizers. FIG. 11 is a diagram illustrating positional relations between the polarizers and the photodiodes. FIG. 11 illustrates a cross section of layered structures of polarizer layers 230a, 230b, and 230c and pairs of photodiodes 232a, 232b, and 232c, and positional relations 234a, 234b, and 234c between the polarizer layers 230a, 230b, and 230c and the pairs of photodiodes 232a, 232b, and 232c as viewed from upper surfaces.

First, in the case of pixels provided with no polarizers in the polarizer layer 230a as in (a), incident light reaches the photodiodes without any loss. Accordingly, the photodiodes of the pair detect an equivalent luminance level. In pixels provided with the polarizers present in the polarizer layer 230b or 230c as in (b) and (c), reflection from the wires of the polarizers reduces light reaching the photodiodes to approximately 50% of the incident light. When a color image is generated by summing the detection values from the two photodiodes to obtain a pixel value, the luminance level of the pixel can be set equivalent to the luminance level of surrounding pixels by multiplying the pixel value by a predetermined value or performing interpolation using detection values for the surrounding pixels.

On the other hand, in a case where the wire array of the polarizers is asymmetric with respect to a centerline 236 in a longitudinal direction of the pixel as in (b), the coverage area of the wires lying opposite to the pair of photodiodes 232b differs between the left photodiode and the right photodiode. This leads to a difference in detection sensitivity between the photodiodes of the pair. In a case where phase difference images are generated using pixels including such pixels, the phase difference may fail to be accurately detected. The level may be homogenized by multiplying the detection value from the photodiode with a lower sensitivity by a predetermined value based on a wire area ratio. However, this also amplifies noise and does not necessarily improve the accuracy for the phase difference.

Figure 12:
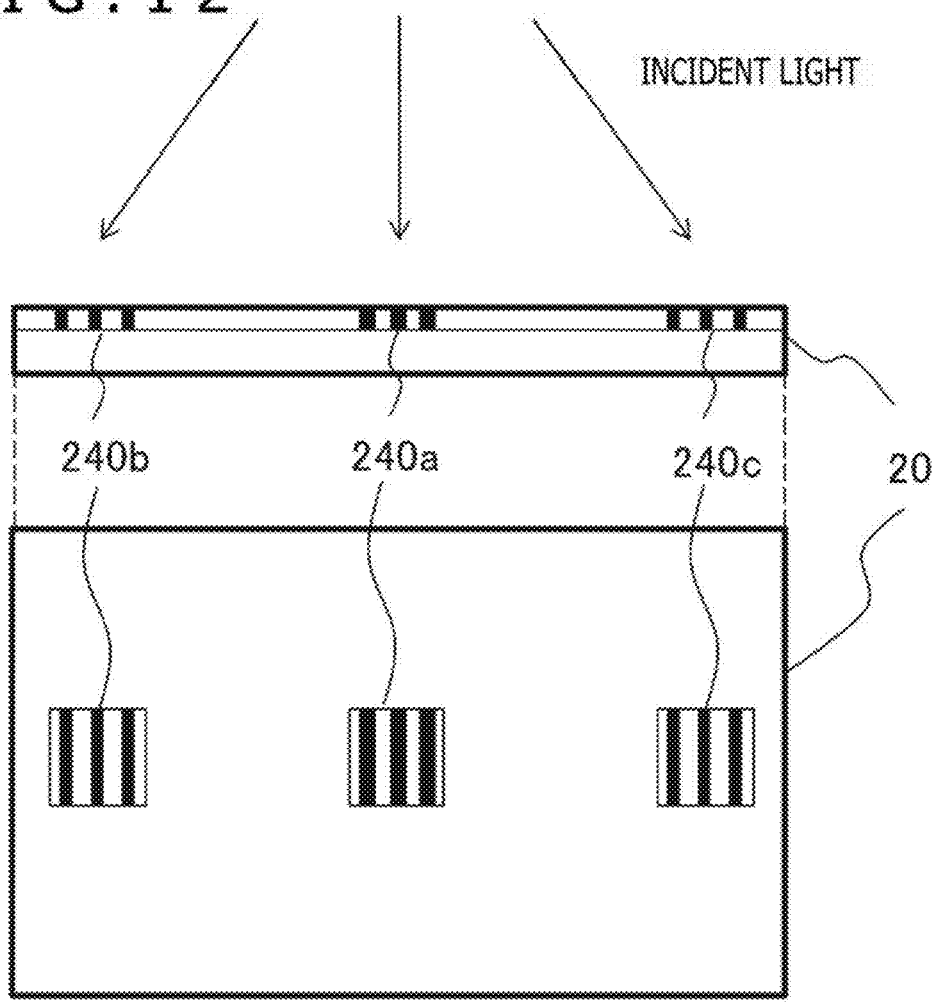
FIG. 12 is a diagram schematically illustrating a wire array of polarizers at different positions on an image capturing surface in the related art.

Accordingly, as illustrated in (c), the wires of the polarizers are desirably arranged symmetrically with respect to the centerline 236 in the longitudinal direction of the pixel. This enables a reduction in the effect of the polarizers on the luminance levels detected by the photodiodes in one pixel. The difference in photodetection sensitivity caused by the polarizers also results from the positions of the pixels in the surface of the image capturing element 20. FIG. 12 schematically illustrates the wire arrays of the polarizers at different positions on the image capturing surface.

As illustrated in a side view in an upper stage, in a pixel 240a near the center of the image capturing element 20, light is incident almost vertically, while an incident angle (CRA; Chief Ray Angle) increases consistently with distance from the center. Thus, toward peripheral portions, the wires of the polarizers produce a higher practical shielding effect to make incidence of light more difficult, resulting in a photodetection sensitivity lower than the photodetection sensitivity in a central portion. This causes not only the loss of the balance of the luminance level between the phase difference images as described above but also an in-plane distribution even in a normal image obtained using polarized light or a color image generated by correcting the polarization luminance.

Thus, suitably, the shape of the polarizer is varied according to the position on the image capturing element 20 to make the detection sensitivities of the photodiodes uniform. In the illustrated example, compared to the pixel 240a in the central portion, pixels 240b and 240c in the peripheral portions include polarizers with a reduced wire width and thus involve a reduced loss of incident light. In actuality, the wire width is gradually reduced with increasing distance from the central portion. Alternatively, a wire height may be reduced or both width and height may be varied according to the distance from the central portion.

Alternatively, the entire array of the wires may be shifted by a minute amount line-symmetrically with respect to the centerline. For example, for the left pixel 240b on the image capturing element 20, the entire wire array is shifted leftward, and for the right pixel 240c on the image capturing element 20, the entire wire array is shifted rightward. This also enables an increase in the amount of incident light according to the angle. For the width and height of the wire and the amount of shift of the array, the values are optimized to minimize the in-plane distribution in the actual captured image. In this case, as described with reference to FIG. 11, the difference in sensitivity between the photodiodes of the pair is also minimized.

Figure 13:
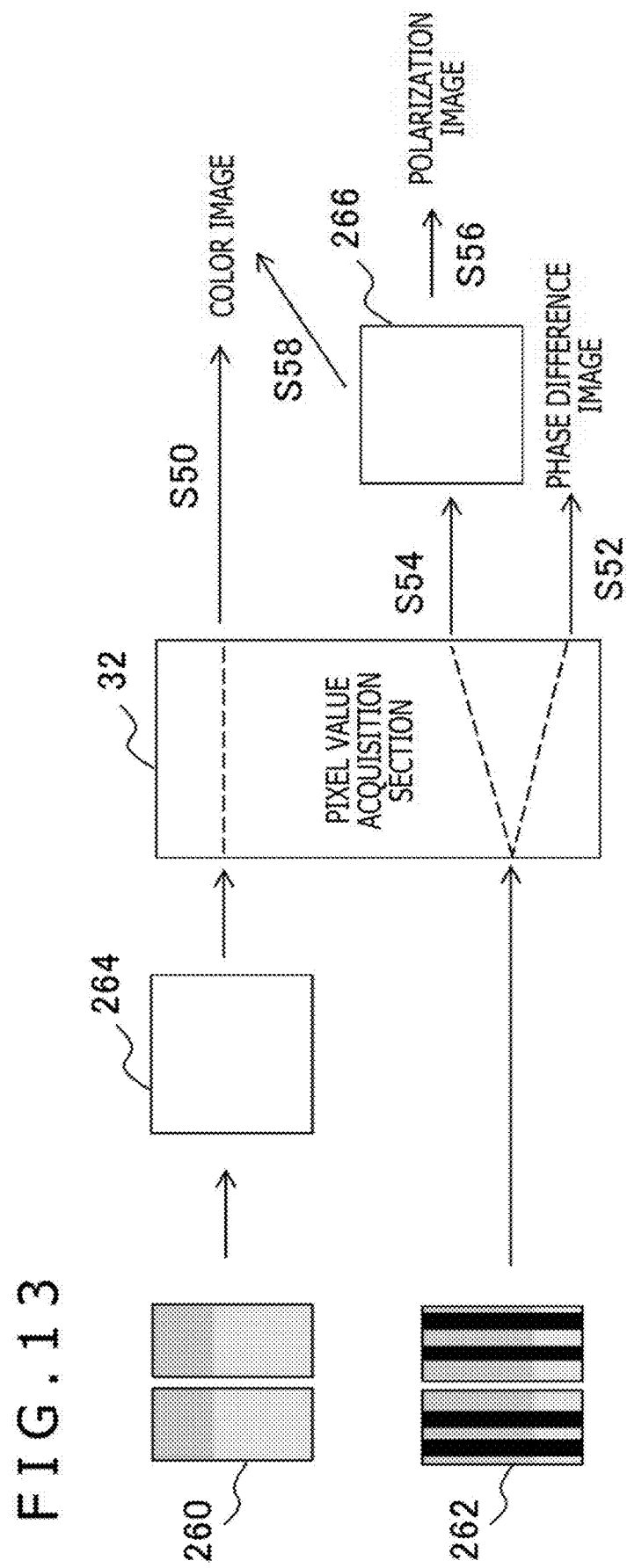
FIG. 13 is a diagram for describing data units and generation paths for various types of information in a case where a read unit is varied depending on the presence of the polarizers in the related art.
Figure 14:
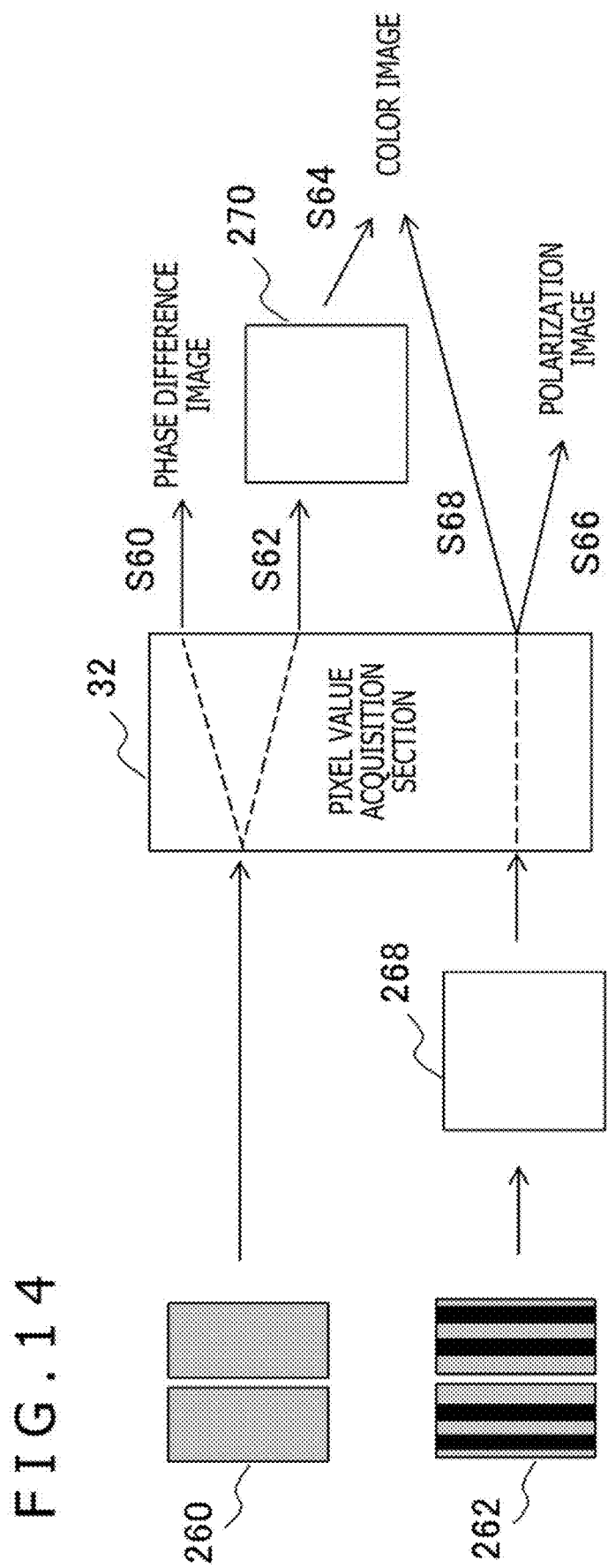
FIG. 14 is a diagram for describing the data units and the generation paths for various types of information in a case where the read unit is varied depending on the presence of the polarizers in the related art.

In the aspect described above, the detection values from all the photodiodes are individually read, and the image processing section 22 extracts or interpolates needed data. In this case, compared to general pixel values, the data may require more time for reading, constraining the frame rate. Thus, the read unit may be varied depending on the presence of the polarizers to reduce the time required for reading. FIG. 13 and FIG. 14 are diagrams for describing the data units and generation paths for various types of information in a case where the read unit is varied depending on the presence of the polarizers.

In FIG. 13, for a pixel 260 provided with no polarizers, the detection values from the two photodiodes are totaled, with the resultant value read as a pixel-unit value 264. On the other hand, for a pixel 262 provided with the polarizers, each of the detection values from the two photodiode is read, and the data are fed to the functional blocks via the pixel value acquisition section 32. The detection value from the pixel 260 provided with no polarizers which value results from the totaling can be directly used to generate a color image (S50).

The values detected by the two photodiodes for the pixel 262 provided with the polarizers are used to generate phase difference images (S52). Additionally, in this stage, the detection values are totaled to obtain a pixel-unit value 266 (S54), which is used to generate a polarization image or to determine a color value for the pixel in the color image (S56, S58). In this case, polarization information and phase difference information are acquired only from the pixel provided with the polarizers. In an environment having a low rate of the pixels 262 provided with the polarizers and a relatively high illuminance, the path as illustrated can be used to reduce the read time with a certain level of accuracy maintained, enabling an increase in speed.

In the case of FIG. 14, for the pixel 260 provided with no polarizers, each of the detection values from the two photodiodes is read. On the other hand, for the pixel 262 provided with the polarizers, the detection values from the two photodiodes are totaled, with the resultant value read as a pixel-unit value 268. The data is fed to the functional blocks via the pixel value acquisition section 32. The detection values detected by the respective two photodiodes for the pixel 260 provided with no polarizers are used to generate phase difference images (S60). Additionally, in this stage, the detection values are totaled to obtain a pixel-unit value 270 (S62), which is used to generate a color image (S64).

The detection value from the pixel 262 provided with the polarizers which value results from the totaling is directly used to generate polarization images or to determine a color value for the pixel in the color image (S66, S68). In this case, the phase difference information is acquired from the pixels other than the pixels provided with the polarizers. This case, compared to the case in FIG. 13, can increase sensitivity for the phase difference information, allowing accuracy to be maintained even in an environment with a low illuminance. By thus varying the read unit depending on the presence of the polarizers, the read time can be reduced with needed information acquired.

Note that all of the processing illustrated in FIG. 13 and FIG. 14 may be omitted depending on the required type, accuracy, or resolution of information. For example, with the values for the pixels provided with the polarizers not used to generate a color image, the values for the surrounding pixels provided with no polarizers may be interpolated. Additionally, the read unit and the path for data generation may be optimized according to the accuracy and resolution needed for various data, a surrounding lighting environment, a limitation on processing time, and the like. With the illuminance measured or a communication environment for data transmission measured, the read unit and the path for data generation may switched depending on the result of the measurement.

Figure 15:
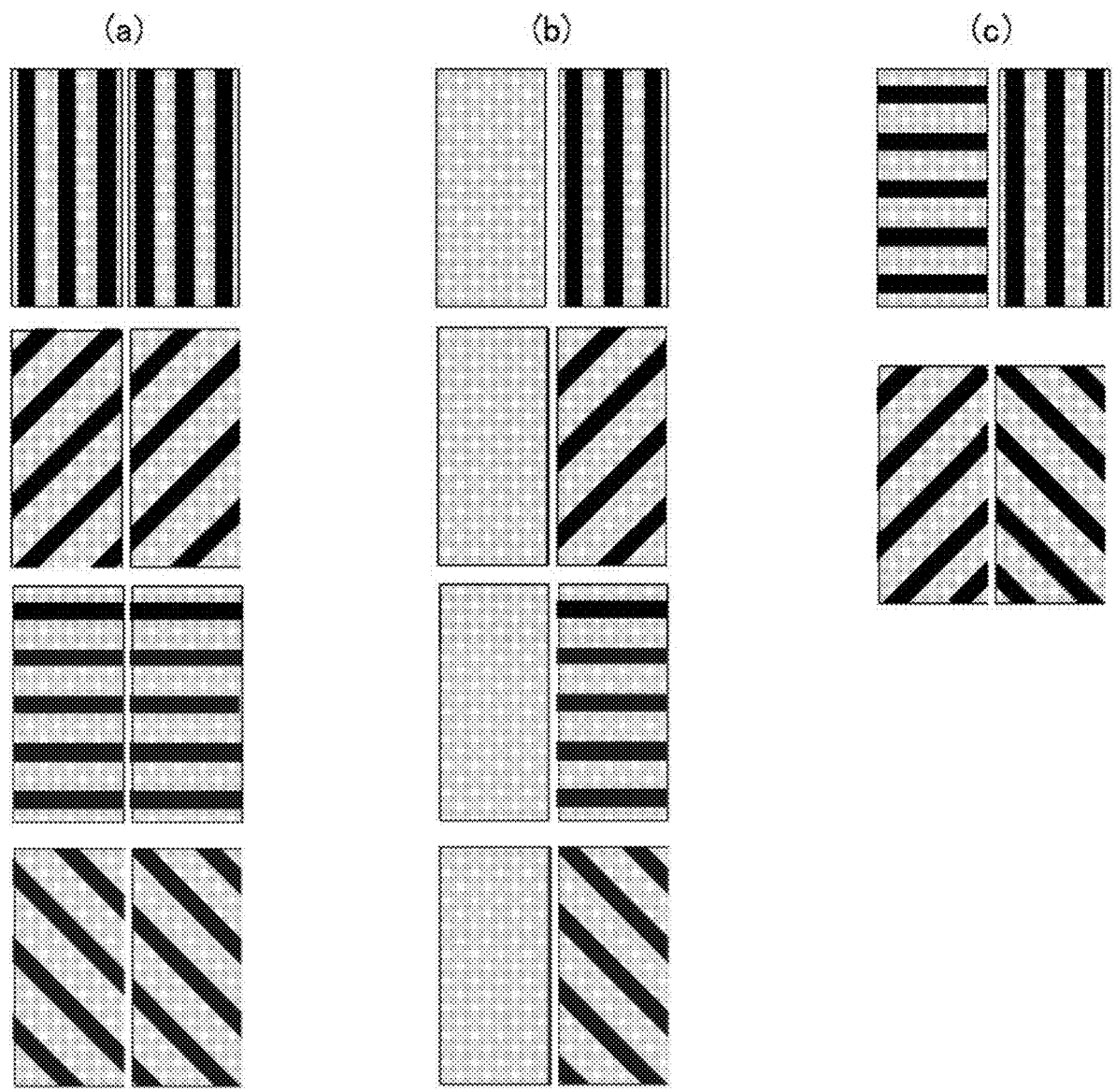
FIG. 15 is a diagram illustrating a variation of polarizers in pixel values provided with the polarizers in the related art.

FIG. 15 illustrates a variation of the polarizers in the pixel values provided with the polarizers. First, four types of pixels illustrated in (a) are each provided with the polarizers each with one main axis angle for one pixel as described above. The main axis angle varying in increments of 45° leads to the four types of pixels as illustrated. The pixels are arranged at regular intervals or proximate to one another in the image capturing element 20. Distribution of the pixels provided with the polarizers also distributes pixels with the luminance level reduced by reflection, and thus in a case where phase difference images or color images are generated using pixels provided with no polarizers, compensation can be accurately achieved by interpolation.

On the other hand, in a case where the four types of pixels as illustrated are arranged proximate to one another in the form of, for example, four pixels in two rows and two columns, variation in polarization luminance according to the orientation can be accurately acquired at substantially the same position, enabling an increase in the accuracy of the normal vectors. In the four types of pixels illustrated in (b), the polarizers with the main axis angles in four directions are provided only in the region corresponding to one of the photodiodes of the pair. In this case, luminance in a state with no polarizers can be acquired from the other photodiode in the same pixel region, and thus the luminance level reduced by the polarizers can be accurately amplified.

This allows the phase difference to be relatively accurately acquired, and thus the entire image capturing element 20 may be configured using pixels as illustrated in (b). Additionally, in the pixels illustrated in (c), the regions corresponding to the photodiodes of the pair are provided with the polarizers with different main axis angles. In the illustrated example, two types of pixels are illustrated each of which includes a pair of the sets of polarizers with the main axis angles differing from each other by 90°.

Processing for acquiring distance values on the basis of the phase difference is based on comparison between the distributions of the detection values from the left and right photodiodes. On the other hand, processing for acquiring normal vectors from the polarization information includes processing for comparing detection values for light transmitted through the polarizers with different main axis angles. Thus, given the polarizers illustrated in (c), the processing for acquiring a phase difference and the processing for acquiring normals can be jointly executed in view of the comparison between the detection values from the left and right photodiodes. This allows the drive circuit to be simplified.

Figure 16:
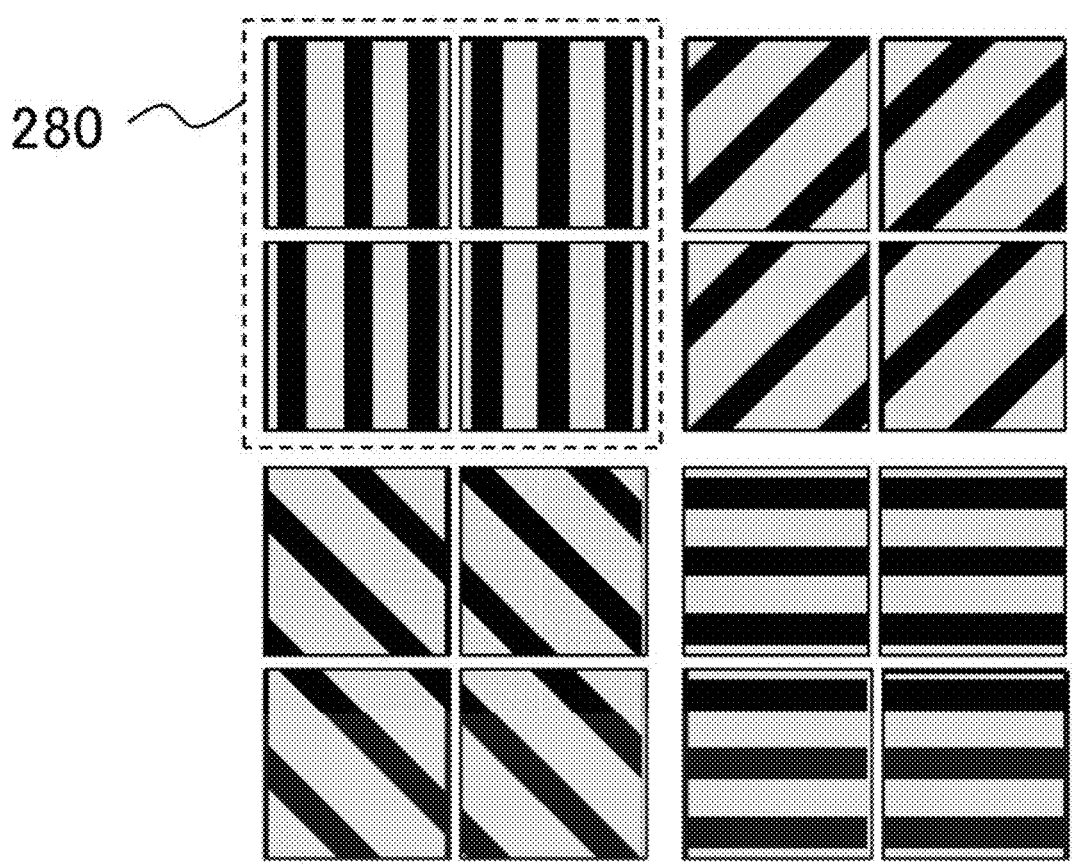
FIG. 16 is a diagram illustrating a variation of photodiodes provided in one pixel in the related art.

FIG. 16 illustrates a variation of the photodiodes provided in one pixel. In the example described above, one photodiode is located in each the left and right regions into which the pixel region is divided in the longitudinal direction. In this case, the phase difference appears only in the horizontal direction of the image plane. Thus, as described with reference to FIG. 9, for some feature points such as horizontal edges, the phase difference is indefinite, preventing distance values from being obtained. Thus, as illustrated, one pixel (for example, a pixel 280) may be divided into four regions corresponding to two regions in the longitudinal direction and two regions in the lateral direction, with one photodiode located in each of the four regions.

In this case, by totaling the detection values from the two photodiodes adjacent in the longitudinal direction, phase difference images are obtained that are the same as the phase difference images obtained using the left photodiode and right photodiode described above, allowing a phase difference between horizontal components to be acquired. On the other hand, by totaling the detection values from the two photodiodes adjacent in the lateral direction, phase difference images are obtained using the upper photodiode and the lower photodiode, allowing a phase difference between vertical components to be acquired. As a result, the distance values can be determined regardless of the directions of the feature points.

Note that, in the illustrated example, each pixel is provided with the polarizers each with one main axis angle but that, as illustrated in FIG. 15, the main axis angle of the polarizer may be varied in units of photodiodes or the presence of the polarizers may be controlled. Additionally, for the pixels provided with no polarizers, the photodiode may similarly be provided in each of the four regions resulting from the division. The pixels provided with the polarizers and the pixels provided with no polarizers as described above may be periodically arranged.

Additionally, the color filter may provide the same color within the pixel or provide different colors for the respective photodiodes. Besides, one photodiode may be provided in each of two, upper and lower regions into which the pixel region is divided in the lateral direction or in each of regions that are each smaller than each of the two regions in two rows and two columns and into which the pixel region is divided.

Figure 17:
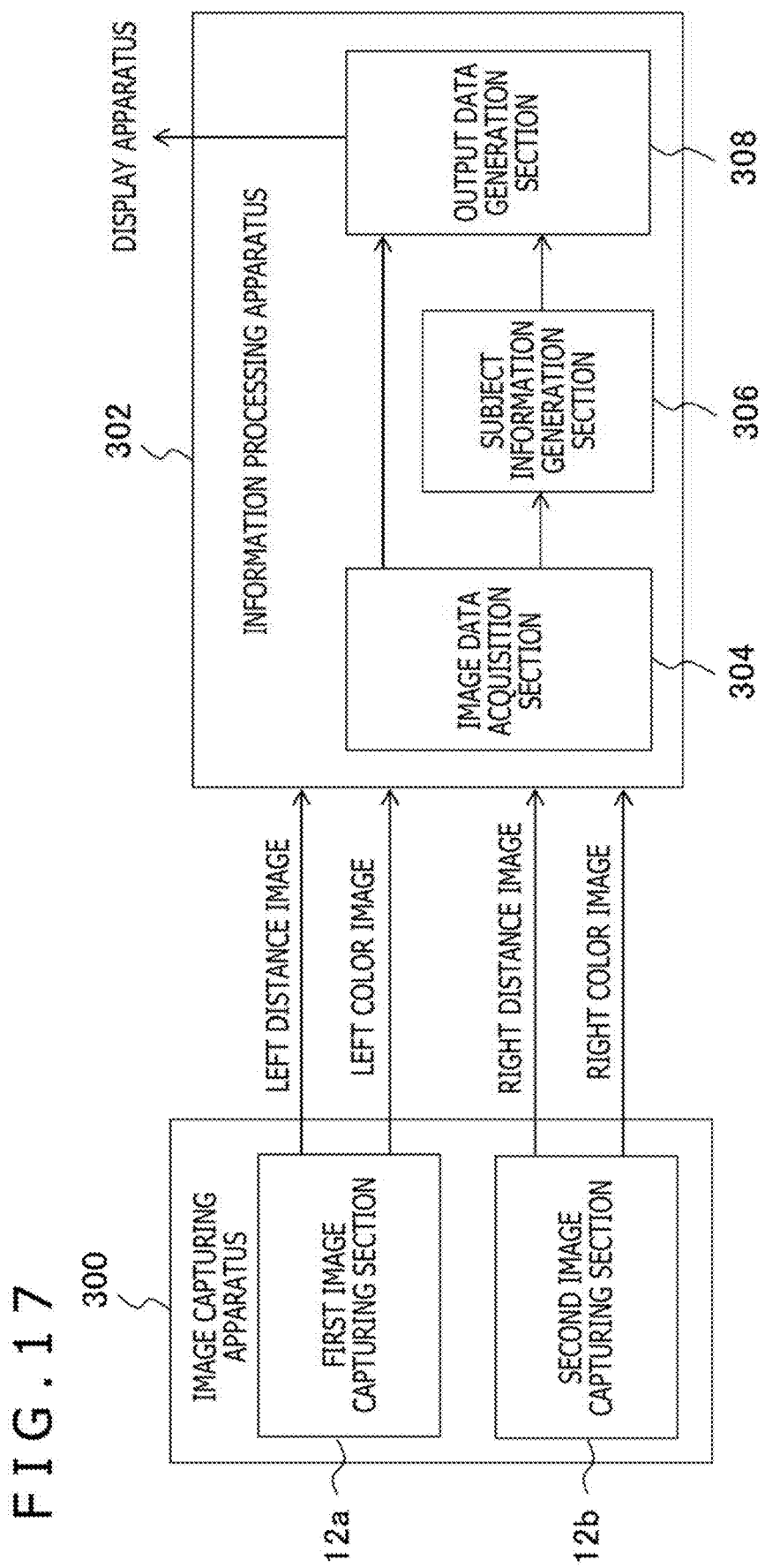
FIG. 17 is a diagram illustrating a configuration of functional blocks of a system in which the image capturing apparatus includes a stereo camera in the related art.

As a variation of the image capturing apparatus 12, two image capturing apparatuses configured as described above may be provided and implemented as a stereo camera. FIG. 17 illustrates a configuration of functional blocks of a system in which the image capturing apparatus is configured as a stereo camera. This system includes an image capturing apparatus 300 and an information processing apparatus 302.

The image capturing apparatus 300 includes a first image capturing section 12*a* and a second image capturing section 12*b*. The first image capturing section 12*a* and the second image capturing section 12*b* each correspond to the image capturing apparatus 12 illustrated in FIG. 1, and are laterally disposed at a predetermined distance from each other as the image capturing apparatus 300. Hereinafter, the first image capturing section 12*a* is assumed as a left viewpoint camera, and the second image capturing section 12*b* is assumed as a right viewpoint camera. The first image capturing section 12*a* and the second image capturing section 12*b* each include an image processing section with the functions illustrated in FIG. 8. Accordingly, the first image capturing section 12*a* of the image capturing apparatus 300 outputs distance image data and color image data for the left viewpoint, and the second image capturing section 12*b* of the image capturing apparatus 300 outputs distance image data and color image data for the right viewpoint.

The information processing apparatus 302 includes an image data acquisition section 304 configured to acquire image data from the image capturing apparatus 300, a subject information generation section 306 configured to integrate the image data to generate comprehensive information regarding the position and orientation of a subject, and an output data generation section 308 configured to use the comprehensive information to generate output data. The image data acquisition section 304 acquires, from the image capturing apparatus 300, at least the distance image data and color image data acquired for each of the left and right viewpoints.

The subject information generation section 306 integrates the distance images acquired from the image capturing apparatus 300 to generate final information regarding the position, orientation, and shape of the subject. Specifically, for portions of the subject that are out of sight from one of the viewpoints of the first image capturing section 12*a* and the second image capturing section 12*b*, the data is compensated for using the other distance image, minimizing the portions with indefinite distances. The subject information generation section 306 may further use color images with the left and right viewpoints or luminance images with the left and right viewpoints to separately generate and integrate distance images on the basis of triangulation.

Figure 18:
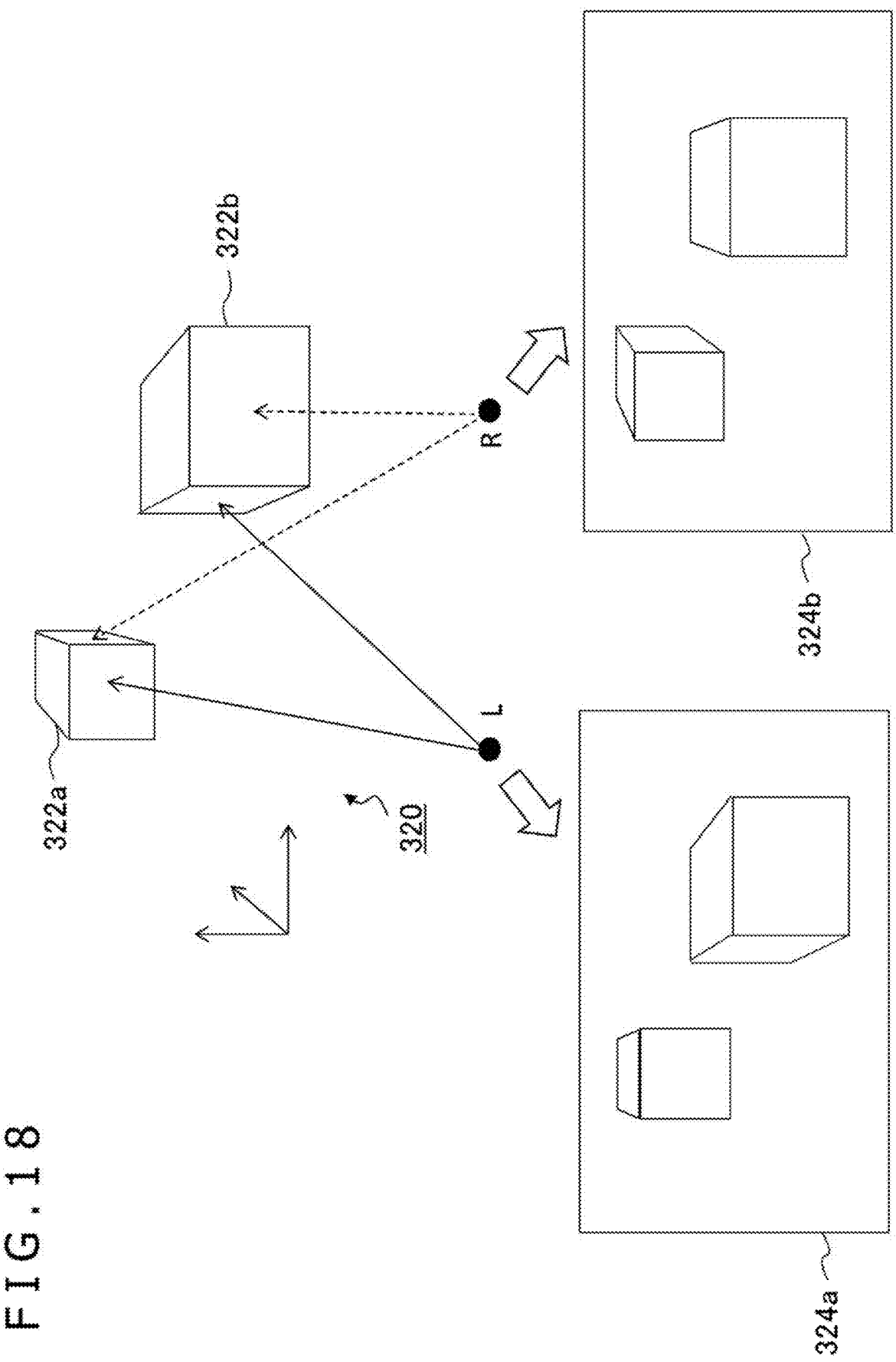
FIG. 18 is a diagram illustrating processing in which a subject information generation section integrates distance images with left and right viewpoints in the related art.

The output data generation section 308 uses color images and distance images with the left and right viewpoints to generate data to be output such as a display image. In a case where the display image is generated, at the time of output, general processing such as a linear matrix (color matrix) or gamma correction is applied to the data, and the resultant data is output to a display apparatus. FIG. 18 is a diagram for describing processing in which the subject information generation section 306 integrates the distance images with the left and right viewpoints. As illustrated in an upper stage in FIG. 18, in a case where an image of a three-dimensional space 320 in which two cubes 322*a* and 322*b* are present is captured from left and right viewpoints L and R, a left viewpoint image 324*a* and a right viewpoint image 324*b* are obtained.

Regions where the first image capturing section 12*a* and the second image capturing section 12*b* can independently acquire distance values are limited to portions appearing as images in the left viewpoint image 324*a* and the right viewpoint image 324b, respectively. In the illustrated example, a left side surface of the cube 322b is in sight only from the left viewpoint L whereas a right side surface of the cube 322a is in sight only from the right viewpoint R. Thus, the distance value for each of the side surfaces is included in only one of the distance images. Accordingly, the subject information generation section 306 applies, to a region on the subject for which obtaining a value from one of the distance images fails, a value from the other distance image to reduce the regions with indefinite distance values.

As a result, a model space more similar to the three-dimensional space 320 can be reproduced. In other words, by integrating distance images with a plurality of viewpoints, the subject information generation section 306 can generate information regarding the position of the subject in the world coordinate system, involving no limitation to one viewpoint. The position is obtained for each very small region on the subject surface, and as a result, the orientation and shape of the subject are also determined.

For regions in sight from both viewpoints, two distance values are obtained, and thus, the accuracy can be increased by, for example, using the average value of the two distance values as a distance value. Furthermore, the subject information generation section 306 may itself generate distance images using color images with the left and right viewpoints and further integrate the results. In this case, for a region in sight from both viewpoints, a further distance value is obtained, and as a result, three distance values are obtained for the region. By using the average value of the three distance values as a distance value, the accuracy can further be increased. However, depending on the required accuracy, the processing time can be reduced by omitting generation of distance images using color images.

Note that the subject information generation section 306 may further use another means to compensate for distance values or to further increase the accuracy. For example, practical use of a deep learning technique as machine learning using a neural network has been started. This is utilized to allow the subject information generation section 306 to learn to derive distance values and variations in the distance values from colors in color images and variations in the colors, the shapes of images, and the like. Then, color images actually acquired may be used to estimate distance values for regions out of sight from the viewpoint of the image capturing apparatus or to correct distance values for visible regions to increase the accuracy.

This method is similarly effective on distance image data output by the image capturing apparatus 12, which is monocular, and thus a subject information generation section with the same function may be provided in an information processing apparatus connected to the image capturing apparatus 12 and not illustrated. This function is particularly effective in extending regions for which the distance value can be obtained and in increasing the accuracy, in a case where the image capturing apparatus has a limited viewpoint and in an environment with an insufficient luminance. Note that the functions of the information processing apparatus 302 including the subject information generation section 306 and some of the functions of the image capturing apparatus 300 may be provided in another apparatus connected to a network or shared among a plurality of apparatuses for calculation. In this case, the information processing apparatus 302 or the display apparatus not illustrated may sequentially acquire the results and appropriately execute the processing of the apparatus or display images according to the results.

Figure 19:
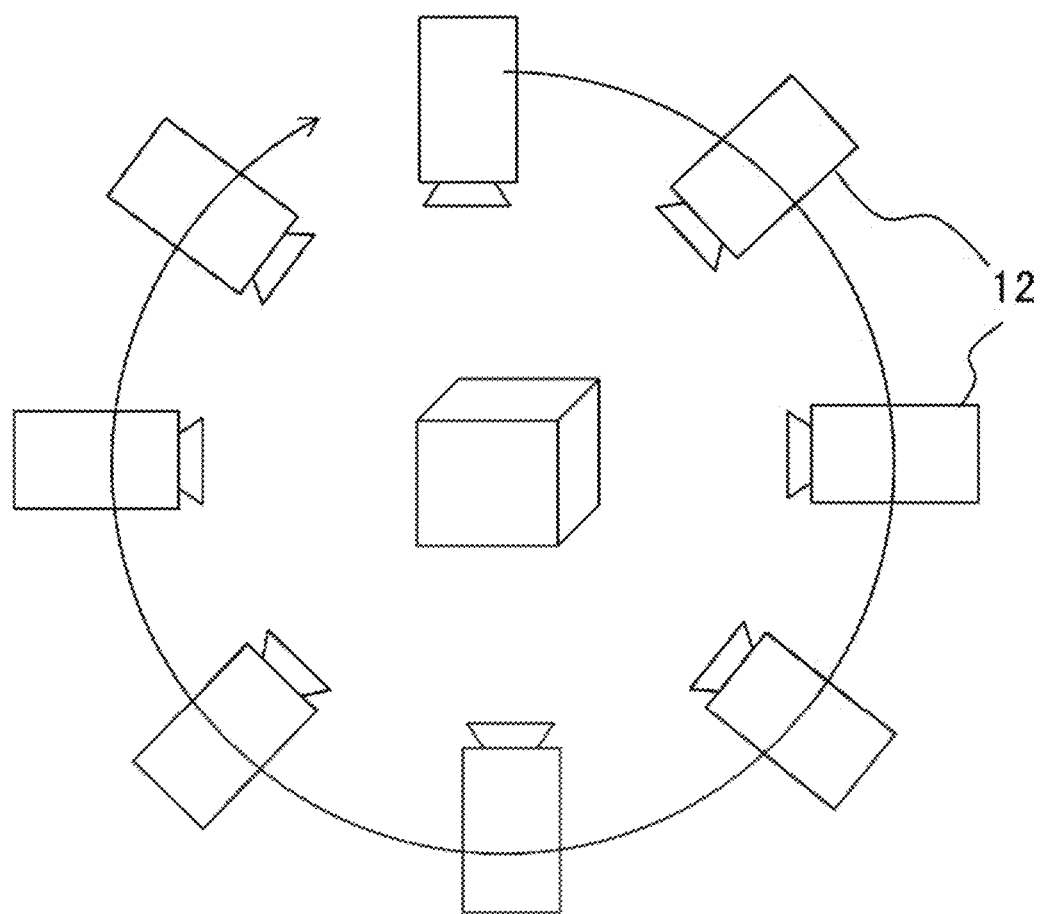
FIG. 19 is a diagram for describing a method for acquiring state information regarding a subject in a three-dimensional space by capturing images while moving the image capturing apparatus in the related art.

Additionally, the image capturing apparatus 300 configured as a stereo camera as illustrated in FIG. 17 allows obtainment of distance values for regions out of sight of a monocular image capturing apparatus. By developing this configuration to make the image capturing apparatus 12 movable, the regions for which the distance value can be obtained may further be extended. FIG. 19 is a diagram for describing a method for acquiring state information regarding the position, orientation, shape, and the like of the subject in the three-dimensional space by capturing images while moving the image capturing apparatus 12.

The illustrated example depicts the image capturing apparatus 12 being moved along a circular path centered at a cube as a subject. Here, the image capturing apparatus 12 is provided with an acceleration sensor to record the dates and times of image capturing, captured images, and the positions and orientations of the image capturing apparatus 12 in the three-dimensional space in association with one another. On the basis of color images and distance images obtained from the viewpoint at each date and time of image capturing at a predetermined rate, a model space such as the three-dimensional space 320 in FIG. 18 is filled with data acquired. Such processing may be executed by the distance image generation section 38 inside the image capturing apparatus 12 or by the subject information generation section 306 of the information processing apparatus 302.

In a case where the processing is executed inside the image capturing apparatus 12, processing loads on the information processing apparatus 302 can be reduced, suppressing an increase in processing time. Note that the manner of moving the image capturing apparatus 12 is not limited to the illustrated manner. For example, the movement of the image capturing apparatus 12 may be limited to a range corresponding to a movable range of a virtual viewpoint for an image to be finally displayed. Alternatively, the image capturing apparatus 12 may be rotated to obtain captured images in all the orientations. Additionally, memory consumption can be suppressed by using, for example, a configuration accumulating only distance values included in data acquired during movement of the image capturing apparatus 12 and corresponding to feature points.

Alternatively, similar information can be obtained by arranging three or more captured images instead of moving the image capturing apparatus 12. In this case, a plurality of image capturing apparatuses 12 are installed to face one another to converge optical axes near the subject as illustrated. Alternatively, the image capturing apparatuses 12 may be oppositely installed to diverge the optical axes outward. In these cases, color images and distance images captured at the same time are obtained from a plurality of viewpoints, and thus the images may be joined together by stitching processing to obtain wide-angle information. In this case, the installed plurality of image capturing apparatuses may be configured such that only some of the image capturing apparatuses are each the image capturing apparatus 12 with the functional blocks illustrated in FIG. 8.

For example, the function to generate distance images is provided in only the image capturing apparatuses capturing images of a subject from which particularly detailed information is to be obtained in an actual space, and the other image capturing apparatuses generate only color images. For example, this allows capturing, in all the orientations, of images depicting the state of a large stadium, with the positions and orientations of main subjects such as players determined in a detailed manner. Accordingly, processing resources can be concentrated on a needed object, for example, subsequent processing such as image processing and superimposition of virtual objects can be accurately executed.

Figure 20:
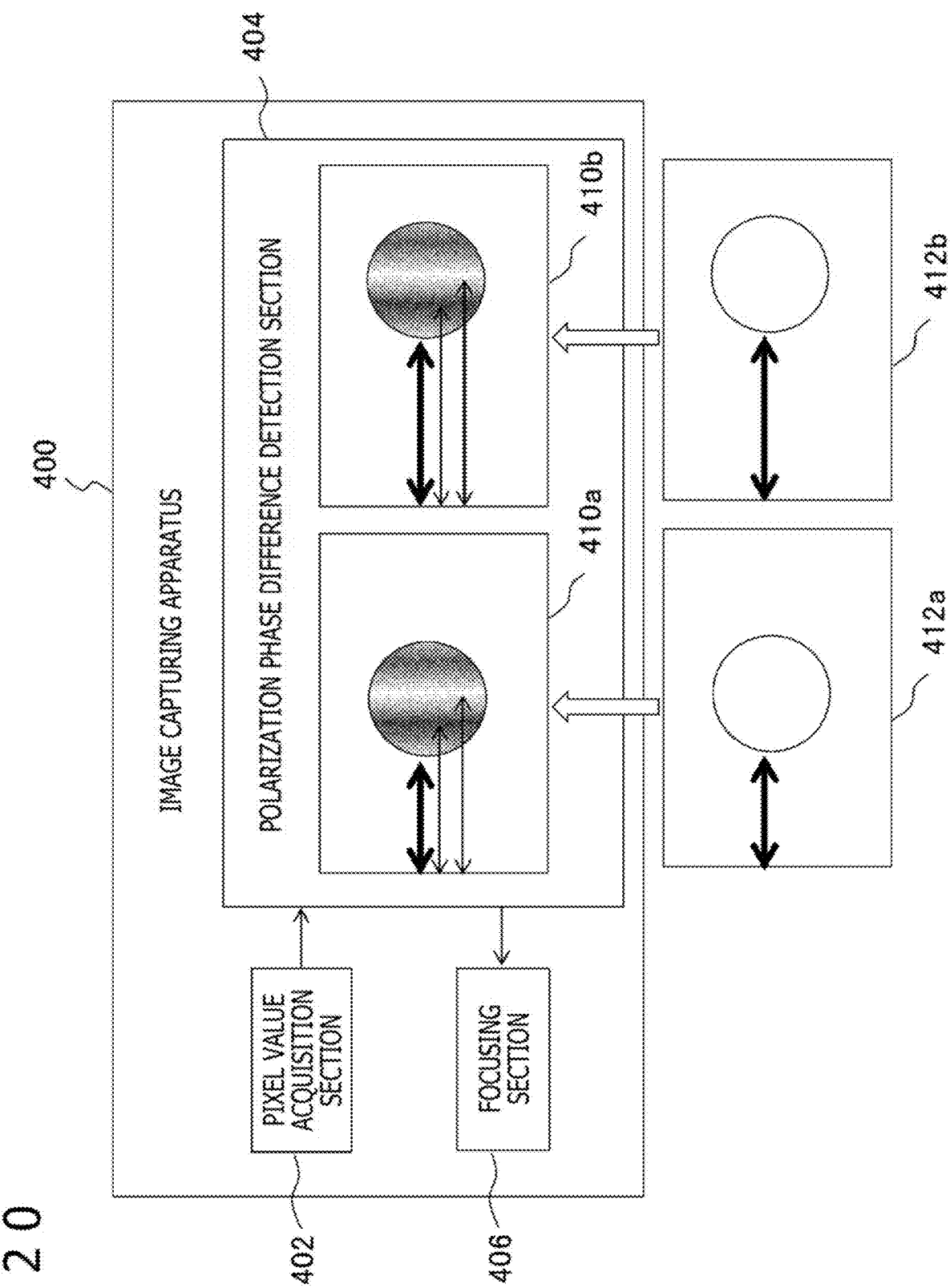
FIG. 20 is a diagram illustrating functional blocks of the image capturing apparatus including a focusing function utilizing a polarization phase difference in the related art.

According to the configuration of the image capturing element of the present embodiment, light transmitted through the polarizers is detected by the two photodiodes, allowing the phase difference between polarization images to be acquired. This can be utilized to increase the accuracy of a focusing function using the phase difference. FIG. 20 illustrates functional blocks of an image capturing apparatus with a function to perform focusing utilizing the polarization phase difference. An image capturing apparatus 400 includes a pixel value acquisition section 402 configured to acquire the detection values from the photodiodes, a polarization phase difference detection section 404 configured to detect the phase difference between polarization images from the detection values from the two photodiodes in the pixel provided with the polarizers, and a focusing section 406 configured to adjust the position of the lens on the basis of the polarization phase difference to achieve focusing on an appropriate position.

The pixel value acquisition section 402 reads the detection values from the photodiodes at least in the pixel provided with the polarizers, and executes predetermined preprocessing such as an A/D conversion or clamp processing. The polarization phase difference detection section 404 separates polarization luminance distributions detected by the left photodiode and the right photodiode and generates polarization images in four orientations for each of the polarization luminance distributions. The polarization phase difference detection section 404 then generates, as phase difference images, degree-of-polarization images in which the degrees of polarization obtained using Equation 2 are expressed on the image plane or normal images in which normal vectors obtained from the degrees of polarization are expressed on the image plane. FIG. 20 illustrates phase difference images 410a and 410b thus generated and using polarized light.

Additionally, in a lower stage in FIG. 20, phase difference images 412a and 412b with general natural light are illustrated for comparison. In the illustrated example, a disc-shaped subject is depicted. In a case where the surface of the subject is monochromatic and has a relatively smooth shape, the phase difference images 412a and 412b with general natural light provide contour lines of the subject as feature points, while providing scarce information regarding the subject surface. Even in a case where the subject surface includes recesses and protrusions, depending on lighting, the recesses and protrusions may fail to be detected as feature points due to insignificant variation in luminance. Thus, in a case where the positions of feature points in the images 412a and 412b are identified as illustrated by arrows and focusing is performed on the basis of the phase difference, accurate adjustment may fail to be achieved due to scarce information.

On the other hand, the phase difference images 410a and 410b expressing the degrees of polarization or the normal vectors express undulations of the subject surface and are thus more sensitive to shapes and less susceptible to lighting, than images with natural light. Thus, even in an apparently uniform image, variations corresponding to the shape appear as images as illustrated. Accordingly, more positions of feature points supporting the phase difference are obtained as illustrated by arrows. By integrating these positional relations to derive a phase difference and executing focusing processing on the basis of the phase difference, more accurate and quicker adjustment can be achieved.

As is the case with general focusing processing, the focusing section 406 derives the appropriate position of the lens and makes adjustment on the basis of the phase difference. Note that the illustrated image capturing apparatus 400 depicts the functional blocks focusing only on the focusing function but may be combined with the image processing section 22 illustrated in FIG. 8 to output distance images or color images based on luminance data resulting from accurate focusing.

According to the present embodiment described above, the image capturing element has a structure in which a plurality of photodiodes are provided for one microlens and in which polarizers are provided in an intermediate layer between at least a part of the microlens and the photodiode. This allows polarization images and phase difference images to be simultaneously acquired. Then, distances to feature points on the subject are determined on the basis of the phase difference, and normal vectors obtained from polarized light are used to supplement the distances to the feature points. Thus, the image capturing element, which corresponds to a monocular camera, can provide distance values over a wide region of the captured image.

In a distance measurement technique using a general stereo camera, the distance is indefinite for surfaces of a subject depicted in an image with one viewpoint but not depicted in an image with the other viewpoint. The above-described method according to the present embodiment allows the distance to be derived as long as the corresponding surface is depicted in the captured image. Thus, in some cases, the method provides more distance data than the use of the stereo camera. Thus, the method can be used instead of the stereo camera and can miniaturize the image capturing apparatus with the distance measurement function.

Additionally, by implementing such an image capturing apparatus as a stereo camera, the results of left and right captured images can be integrated, providing a wider range of distance values to allow accurate reproduction of the position and orientation of the subject in the three-dimensional space. Furthermore, by using color images with the left and right viewpoints to determine and integrate distance images as in the related art, the accuracy of distance information can be improved. These methods are independent of light in a specific wavelength band such as infrared light, and thus information can be similarly obtained even outdoors.

Additionally, the pixels provided with the polarizers and the pixels provided with no polarizers can be appropriately controlled, allowing color images and phase difference images to be generated at a luminance level used in the related art. This enables application to any information processing without limitation on the subsequent processing. Additionally, basically, units of a row or several rows on the image plane can be used to execute processing of acquiring distance values based on the phase difference, generating normal images based on polarized light, and integrating the values and the images to generate a distance image, and thus the processing can be implemented by an arithmetic circuit in the image capturing apparatus using a line buffer. Thus, the image capturing apparatus can share the functions with an apparatus configured to execute information processing or display processing using various data, and can be configured to support image capturing and display at a high frame rate.

Furthermore, the polarization phase difference can be acquired, and thus even for subject surfaces with few undulations that are not extracted from an image with natural light as feature points, variation in shape can be sensitively extracted as feature points. Accordingly, much information supporting the phase difference can be obtained, allowing the accuracy of the known focusing function to be increased. Note that, in a case where the present embodiment is implemented as a stereo camera, more feature points are obtained using degree-of-polarization images and normal images than using luminance images with natural light, and that the accuracy of generation of distance images can thus be increased that is based on acquisition of corresponding points from images with the left and right viewpoints.

The present invention has been described on the basis of the embodiment. A person skilled in the art could understand that the above-described embodiment is illustrative and that various modifications can be made to combinations of the components or processes of the embodiment and that such modified examples are also within the scope of the present invention.

For example, the present embodiment uses the photodiodes, but detection entities are not limited to the photodiodes as long as the detection entities include mechanisms converting light into charge. For example, some or all of the photodiodes may be organic photoelectric conversion films. For example, a known technique described in WO 2014/156659 or the like can be used to appropriately determine a material and a structure for the organic photoelectric conversion film.

Alternatively, the present embodiment may be combined with a distance measurement technique based on radiation of light in a predetermined wavelength band such as infrared light. Specifically, the image capturing apparatus 12 is provided with a mechanism to radiate reference light, and the photodiodes detect reflected light of the reference light. Radiation of the reference light in a random pattern allows even a subject surface with few feature points to create feature points. Although processing in the image processing section is similar to the corresponding processing in the present embodiment, many feature points are provided that support the phase difference, allowing the distance value based on the phase difference to be acquired at more positions. Accordingly, the accuracy of the supplementation using normal vectors is improved, allowing distance information to be more accurately obtained. The image capturing apparatus 12 may further be provided with an illuminance sensor to radiate the reference light in a case where the illuminance is lower than a predetermined value, thus preventing a decrease in analysis accuracy due to a reduced illuminance.

Furthermore, the image capturing apparatus according to the present embodiment may be implemented by a general camera including acquisition of color images as a main function or may be provided in any other apparatus with the image capturing function. The image capturing apparatus may be provided in, for example, an intelligent cellular phone, a portable terminal, a personal computer, a capsule endoscope, or a wearable terminal. In a case where such an apparatus need not acquire color images, the functions of the defect correction section 40 and the color image generation section 42 may be omitted, with only distance images output. In this case, the color filter layer of the image capturing element may be omitted.

Additionally, in the image capturing element according to the present embodiment, in principle, the entire pixel region is divided into partial regions, and the photodiode is located in each of the partial regions. However, the division into the partial regions may be omitted in some of the pixels, and each of these pixels may be provided with one photodiode corresponding to one microlens. For example, each of the pixels provided with the polarizers may be provided with one photodiode. In this case, phase difference images are acquired from the other pixels. Alternatively, conversely, the pixels provided with the polarizers may each be provided with a plurality of photodiodes. In any case, with omission of the processing for totaling the detection values described in the present embodiment, similar effects can be produced.

EMBODIMENTS

The embodiment of the present invention can be appropriately combined with the above-described related art. First to third examples will be described as embodiments of the present invention.

First Example

An outline of a camera system in the first example will be provided. As a method for obtaining parallax images for realizing stereoscope in a head mounted display (hereinafter referred to as an "HMD"), a method is known in which a plurality of cameras are used to capture images of the same subject (including a space) to generate parallax images. Additionally, a method for rotating one camera to generate parallax images is known.

However, in a case where a plurality of cameras are used to capture images of the same subject, the plurality of cameras need to be arranged to face the same direction, disadvantageously leading to an increased size. In particular, in a case where the cameras have a large optical size or are used to capture wide-angle images, the problem with the size is pronounced. Additionally, in a case where one camera is rotated to generate parallax images, acquiring parallax of a moving object (hereinafter referred to as a "moving body") is disadvantageously difficult. This is because not only the moving body but also the camera itself moves (rotates). Additionally, many cameras can acquire parallax exclusively in the lateral direction (in other words, in the horizontal direction), and in a case where the user wearing the HMD tilts the head to the side, stereopsis may be disrupted.

The camera system in the first example includes two 360-degree cameras placed on top of each other in the vertical direction and that can capture images of a surrounding space through 360 degrees. This enables acquisition of parallax in the longitudinal direction. Additionally, in the camera system in the first example, the upper camera and the lower camera are constantly rotated in different manners. This enables acquisition of parallax in the lateral direction and acquisition of the parallax of the moving body.

Figure 21:
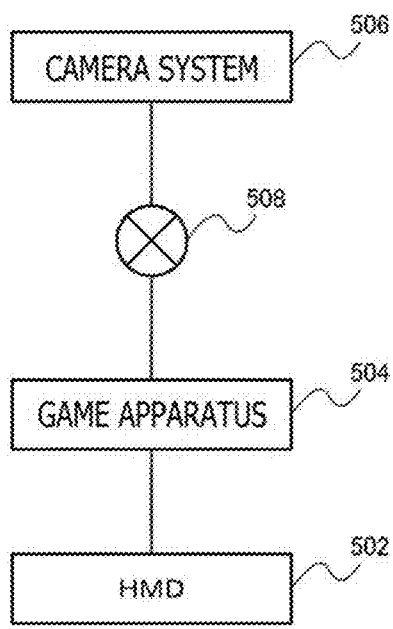
FIG. 21 is a diagram illustrating a configuration of an entertainment system in a first example.

FIG. 21 illustrates a configuration of an entertainment system in the first example. An entertainment system 500 includes an HMD 502 mounted on the head of the user, a game apparatus 504, and a camera system 506. The camera system 506 and the game apparatus 504 are connected via a communication network 508 such as a LAN (Local Area Network), a WAN (Wide Area Network), or the Internet. The HMD 502 and the game apparatus 504 may be connected via HDMI (High-Definition Multimedia Interface) (registered trademark).

The game apparatus 504 is an information processing apparatus configured to control display of content in the HMD 502. In the first example, the game apparatus 504 detects the orientation of the HMD 502 (in other words, a line-of-sight direction of the user) by a known method, and transmits, to the camera system 506, orientation information indicating the orientation of the HMD 502. The game apparatus 504 receives, from the camera system 506, a parallax image corresponding to the orientation of the HMD 502, and transmits the parallax image to the HMD 502 to cause the HMD 502 to display the parallax image.

Figure 22:
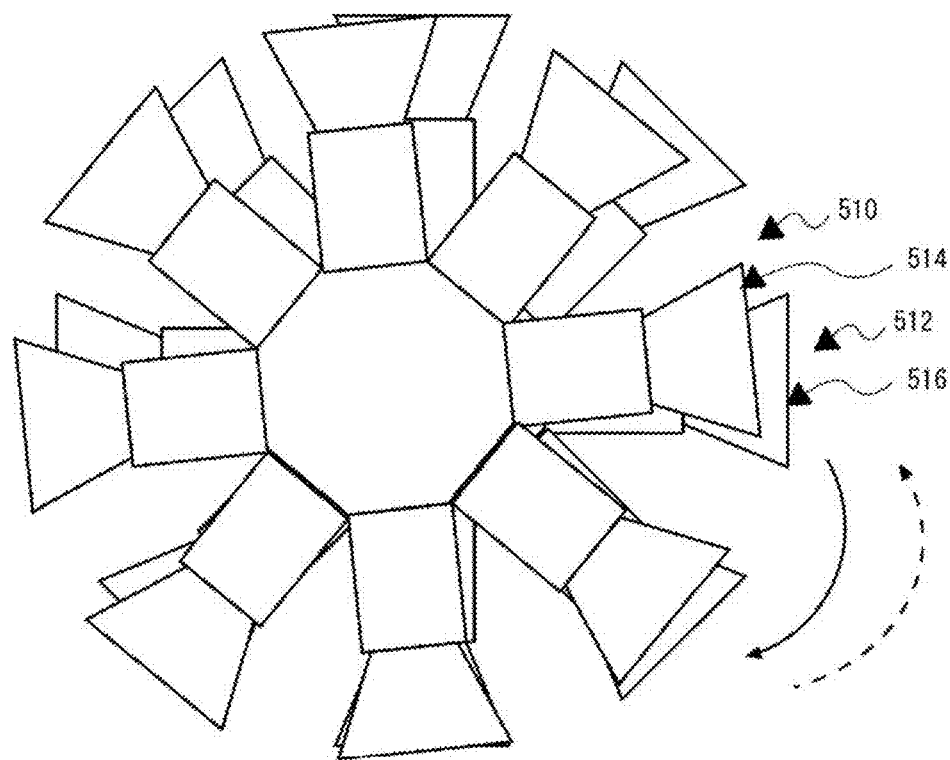
FIG. 22 is a diagram illustrating an arrangement aspect of cameras in a camera system in FIG. 21.

The camera system 506 is a data processing system including a plurality of cameras (for example, video cameras) to generate a parallax image corresponding to the orientation of the HMD 502. FIG. 22 illustrates an arrangement aspect of the cameras in the camera system 506 in FIG. 21. FIG. 22 schematically illustrates appearance of the camera system 506 as viewed from above. The camera system 506 includes a first image capturing section 510 and a second image capturing section 512 installed below the first image capturing section 510 in a height direction.

The first image capturing section 510 includes a plurality of video cameras (in FIG. 22, eight cameras 514) installed such that the video cameras can capture images of a surrounding space through 360 degrees. Similarly, the second image capturing section 512 includes a plurality of video cameras (in FIG. 22, eight cameras 516) installed such that the video cameras can capture images of a surrounding space through 360 degrees. In other words, the camera system 506 includes two 360-degree cameras placed on top of each other in the vertical direction.

In the camera system 506, the first image capturing section 510 (that is, the plurality of cameras 514) is constantly rotated in the horizontal direction, and the second image capturing section 512 (that is, the plurality of cameras 516) is also constantly rotated in the horizontal direction. In FIG. 22, a rotating direction of the first image capturing section 510 is illustrated by a solid circular arc with an arrow (clockwise as viewed from above). Additionally, a rotating direction of the second image capturing section 512 is illustrated by a dashed circular arc with an arrow (counter-clockwise as viewed from above).

The plurality of cameras 14 in the first image capturing section 510 are installed to capture images in different directions. The plurality of cameras 516 in the second image capturing section 512 are similarly installed to capture images in different directions. The adjacent cameras may be configured such that the angles of view of the cameras are prevented from overlapping. This is because rotation of the cameras enables acquisition of parallax in the lateral direction, eliminating a need to capture images of the same subject using the plurality of cameras. This allows the size of the camera system 506 to be suppressed even in a case where wide-angle images are to be obtained.

Additionally, the first image capturing section 510 is configured such that at least one of the cameras 514 captures an image of a preset specific region, and the second image capturing section 512 is also configured such that at least one of the cameras 516 captures an image of the specific region. This enables parallax information regarding the specific region to be constantly acquired. The above-described specific region may be a spatial region that the HMD 502 is to be caused to display or a spatial region that may be displayed by the HMD 502. Note that the first image capturing section 510 and the second image capturing section 512 in the first example include 360-degree cameras and can thus acquire not only parallax information regarding the above-described specific region but also parallax information in all the orientations. The camera system 506 capturing images only in some of the orientations will be described below as a second example.

Figure 23:
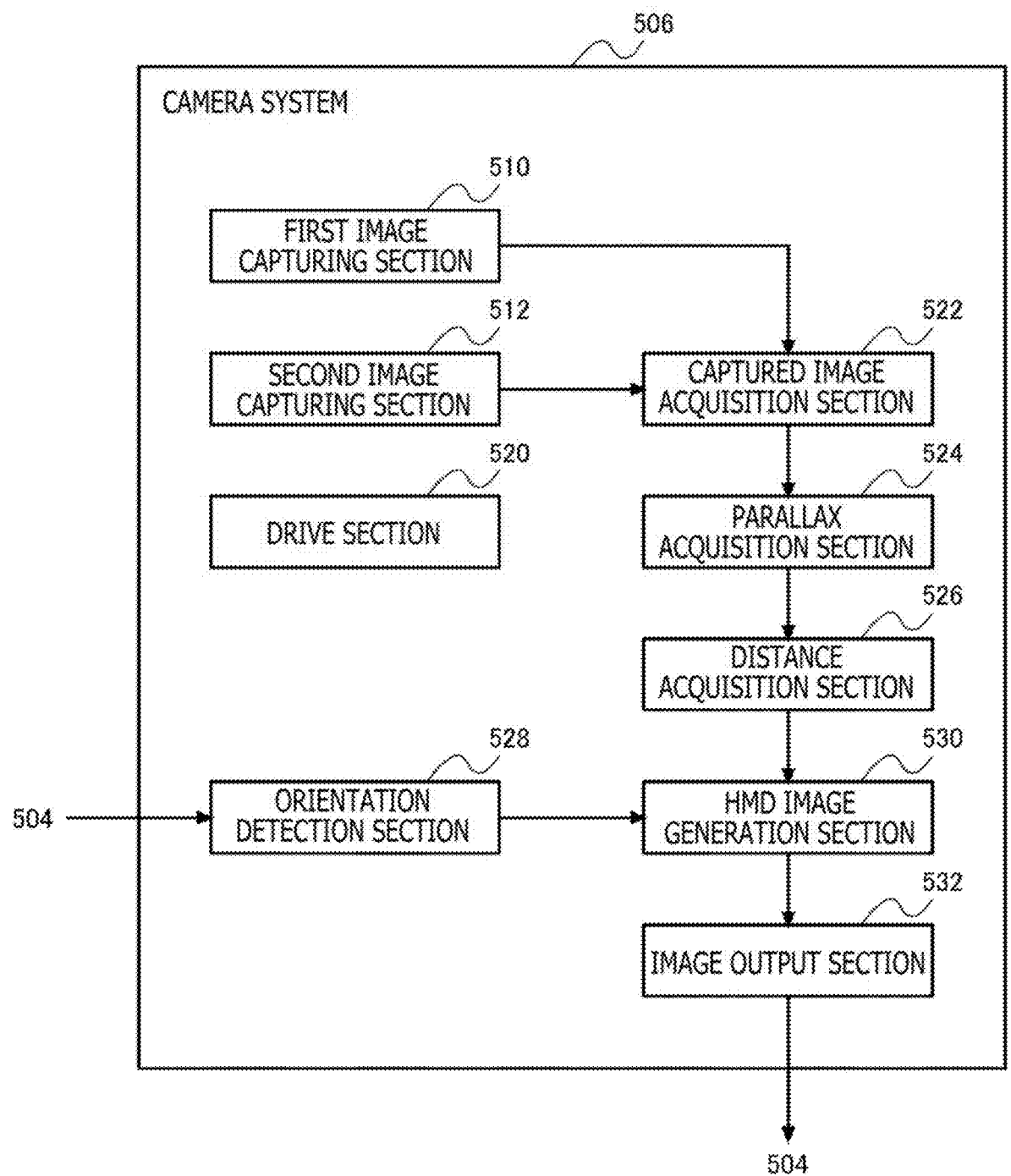
FIG. 23 is a block diagram illustrating a functional configuration of a camera system 506 in FIG. 21.

FIG. 23 is a block diagram illustrating a functional configuration of the camera system 506 in FIG. 21. The camera system 506 includes the first image capturing section 510 and the second image capturing section 512 described in connection with FIG. 22, a drive section 520, a captured image acquisition section 522, a parallax acquisition section 524, a distance acquisition section 526, an orientation detection section 528, an HMD image generation section 530, and an image output section 532.

In the block diagrams herein, elements illustrated as functional blocks configured to execute various types of processing can include, in terms of hardware, circuit blocks, memories, or other LSIs (Large Scale Integrations) and can be implemented, in terms of software, by, for example, programs loaded in the memories. Accordingly, a person skilled in the art could understand that these functional blocks can be implemented by only hardware, only software, or a combination of the hardware and the software in various forms, and limitation of the functional blocks to one of the configurations is not intended.

For example, the camera system 506 may be implemented by a unitary data processing apparatus or a plurality of data processing apparatuses cooperating with one another. Additionally, a computer program including a plurality of modules corresponding to the plurality of functional blocks in FIG. 23 may be installed in a storage in the camera system 506. A CPU (Central Processing Unit) in the camera system 506 may read the computer program into a main memory and executes the computer program to cause the functional blocks to accomplish the functions.

The drive section 520 rotates at least one of the first image capturing section 510 (that is, the plurality of cameras 514) and the second image capturing section 512 (that is, the plurality of cameras 516) in a predetermined direction, and in the case of rotating both the first image capturing section 510 and the second image capturing section 512, rotates the image capturing sections 510 and 512 in different manners. The different manners include at least one of different rotating directions and different rotation speeds.

In the example, as illustrated in FIG. 22, the drive section 520 rotates the first image capturing section 510 and the second image capturing section 512 at the same speed, while rotating the first image capturing section 510 and the second image capturing section 512 in the opposite directions. The rotation speed is not limited, and may be, for example, one circuit per second (angular velocity=2Π (rad/sec)) or one circuit per two seconds (angular velocity=Π (rad/sec)).

The captured image acquisition section 522 acquires data (for example, pixel values) output from the first image capturing section 510 and related to images captured by the first image capturing section 510. Additionally, the captured image acquisition section 522 acquires data output from the second image capturing section 512 and related to images captured by the second image capturing section 512.

On the basis of a plurality of images depicting a specific region in a surrounding space of the camera system 506, the parallax acquisition section 524 acquires parallax information regarding an object present in the specific region. As described above, the first image capturing section 510 and the second image capturing section 512 include 360-degree cameras and thus constantly capture images in all the orientations. The parallax acquisition section 524 may divide the surrounding space into a plurality of regions and acquire parallax information regarding each of the plurality of regions. The parallax acquisition section 524 acquires parallax information regarding both a stationary object and a moving body present in the surrounding space of the camera system 506.

Here, for a stationary object present in the surrounding space of the camera system 506, by comparing a plurality of images including the stationary object and captured by one rotating image capturing section (for example, one of the first image capturing section 510 and the second image capturing section 512) at a plurality of points of time, parallax of the stationary object resulting from rotation of the image capturing section can be derived. The parallax of the stationary object resulting from rotation of the image capturing section may also be described as parallax based on a distance from the image capturing section to the stationary object.

On the other hand, a subject (moving body) moving through the surrounding space of the camera system 506 has movement of the subject itself, and thus, even with comparison of a plurality of images captured by one rotating image capturing section at a plurality of points of time, parallax based on a distance from the image capturing section to the subject is prevented from being determined. Thus, the parallax acquisition section 524 in the example compares the moving distances of the same subject detected in an image captured by the first image capturing section 510 and an image captured by the second image capturing section 512, to acquire parallax information from which the effect of the movement of the subject itself has been excluded.

A method for acquiring parallax information regarding a moving body will be described. Here, it is assumed that a specific camera (referred to as the camera 514) in the first image capturing section 510 and a specific camera (referred to as the camera 516) in the second image capturing section 512 capture images of the same moving body present in the surrounding space of the camera system 506. Parallax (referred to as "A") in a time axis direction obtained by the camera 514 in the first image capturing section 510 is a difference in video output in the time axis direction and has a known value. Similarly, parallax (referred to as "B") in the time axis direction obtained by the camera 516 in the second image capturing section 512 is a difference in video output in the time axis direction and has a known value.

In a modified example, the camera system 506 may include a first gyro sensor configured to detect the moving distance (rotation amount) of the first image capturing section 510, and may include a second gyro sensor configured to detect the moving distance (rotation amount) of the second image capturing section 512. In this case, the parallax acquisition section 524 may calculate the parallax (A) in the time axis direction obtained by the camera 514 in the first image capturing section 510 according to an output value from the first gyro sensor. Similarly, the parallax acquisition section 524 may calculate the parallax (B) in the time axis direction obtained by the camera 516 in the second image capturing section 512 according to an output value from the second gyro sensor. Accordingly, the parallax of the subject can be determined on the basis of the actual rotation amount measured by the gyro sensors.

In another modified example, the parallax acquisition section 524 may derive the parallax (A) in the time axis direction by detecting the same subject in both of a plurality of images obtained by the camera 514 in the first image capturing section 510 to measure a difference in the position of the subject between the plurality of images. Similarly, the parallax acquisition section 524 may derive the parallax (B) in the time axis direction by detecting the same subject in both of a plurality of images obtained by the camera 516 in the second image capturing section 512 to measure a difference in the position of the subject between the plurality of images.

Next, "dx" is assumed to denote parallax resulting from rotation of the first image capturing section 510, in other words, the parallax related to a distance from the camera 514 in the first image capturing section 510 to the subject. In the first example, the first image capturing section 510 and the second image capturing section 512 have the same rotation speed and opposite rotating directions. Thus, "−dx" denotes parallax resulting from rotation of the second image capturing section 512, in other words, the parallax related to a distance from the camera 516 in the second image capturing section 512 to the subject. Additionally, parallax resulting from action of the subject (movement in the surrounding space) is denoted by "dy."

In this case, Equation 1 and Equation 2 hold true.

$$A = dx + dy \quad \text{(Equation 1)}$$

$$B = -dx + dy \quad \text{(Equation 2)}$$

When a difference between Equation 1 and Equation 2 is determined, A−B=2dx. A and B are known, and thus dx is determined. In other words, the parallax based on the distance from the camera to the subject can be derived, with the parallax (dy) resulting from the action of the subject itself excluded.

As already described, the first image capturing section 510 and the second image capturing section 512 may have the same rotating direction and different rotation speeds, or one of the first image capturing section 510 and the second image capturing section 512 may be exclusively rotated. In a case where "dx" is assumed to denote the parallax related to the distance from the camera 514 in the first image capturing section 510 to the subject, "rdx" (r is a real number) is allowed for the parallax related to the distance from the camera 516 in the second image capturing section 512 to the subject. This is because the dy component is deleted as indicated by Equation 1 and Equation 2 described above.

Additionally, the parallax acquisition section 524 acquires parallax in the longitudinal direction (in other words, the height direction) on the basis of an image captured by the first image capturing section 510 and an image captured by the second image capturing section 512.

The distance acquisition section 526 acquires the distance from the camera 514 (or the camera 516) to the subject on the basis of information acquired by the parallax acquisition section 524 and related to the parallax resulting from the rotation of at least one of the first image capturing section 510 and the second image capturing section 512. For each of a plurality of regions into which the surrounding space of the camera system 506 is divided, the distance acquisition section 526 may measure the distance to each subject (in other words, depth) on the basis of triangulation based on parallax information regarding the subject acquired by the distance acquisition section 526.

The orientation detection section 528 detects the orientation of the HMD 502 (in other words, the line-of-sight direction of the user). In the example, the orientation detection section 528 acquires orientation information indicating the orientation of the HMD 502 and transmitted from the game apparatus 504. The orientation detection section 528 passes, to the HMD image generation section 530, the orientation of the HMD 502 indicated by the orientation information.

The HMD image generation section 530 generates parallax images that the HMD 502 is to be caused to display (for example, an image for the right eye and an image for the left eye; hereinafter referred to as "images for display"). For example, on the basis of a distance to each object present in the surrounding space of the camera system 506, the distance being acquired by the distance acquisition section 526, the HMD image generation section 530 may temporarily generate a panoramic image depicting the state of the surrounding space of the camera system 506 (in the example, 360 degrees around). The HMD image generation section 530 may extract, from the generated panoramic image as images for display, images of a region matching the orientation of the HMD 502 (in other words, the line-of-sight direction of the user) detected by the orientation detection section 528.

Additionally, in a case where the orientation of the HMD 502 indicates that the head of the user is tilted to the side, the HMD image generation section 530 generates images for display on the basis of the parallax in the longitudinal direction acquired by the parallax acquisition section 524. For example, in a case where a distance between the camera 514 in the first image capturing section 510 and the camera 516 in the second image capturing section 512 is set equal to a pupillary distance (for example, approximately 60 to 64 millimeters), the HMD image generation section 530 may generate, as an image for the right eye and an image for the left eye, images obtained by rotating, through 90 degrees, output images from the first image capturing section 510 and the second image capturing section 512.

The image output section 532 transmits, to the game apparatus 504, the images for display generated by the HMD image generation section 530, and causes the HMD 502 to display the images for display via the game apparatus 504. In a modified example, the HMD image generation section 530 may generate a 360-degree panoramic image, and the image output section 532 may provide the panoramic image to the game apparatus 504. In this case, the game apparatus 504 may extract, from the panoramic image, a region corresponding to the orientation of the HMD 502 to generate images for display and cause the HMD 502 to display the images for display.

Operations of the camera system 506 configured as described above will be described. The user uses the game apparatus 504 to initiate an application causing the HMD 502 to display images captured by the camera system 506 (for example, live content viewing application), and mounts the HMD 502 on the head. The game apparatus 504 starts communication with the camera system 506 and repeatedly transmits, to the camera system 506, the orientation information indicating the current orientation of the HMD 502.

The drive section 520 of the camera system 506 rotates each of the plurality of cameras 514 in the first image capturing section 510 and the plurality of cameras 516 in the second image capturing section 512 in different manners. The captured image acquisition section 522 acquires a plurality of images sequentially output from the first image capturing section 510, and also acquires a plurality of images sequentially output from the second image capturing section 512. On the basis of a plurality of images acquired by the captured image acquisition section 522, the parallax acquisition section 524 acquires the parallax of each of a stationary object and a moving body present in the surrounding space of the camera system 506 (specifically, the parallax based on the distance from the camera to each subject).

The distance acquisition section 526 generates depth information indicating the distance from the camera to each subject on the basis of the parallax of the subject acquired by the parallax acquisition section 524. The orientation detection section 528 receives the orientation information transmitted from the game apparatus 504. The HMD image generation section 530 generates a panoramic image indicating the state of the surrounding space of the camera system 506 on the basis of the depth information generated by the distance acquisition section 526, and extracts, from the panoramic image as images for display, images of the region corresponding to the line-of-sight direction of the user indicated by the orientation information.

The image output section 532 transmits the images for display to the game apparatus 504. The game apparatus 504 transmits, to the HMD 502, the images for display received from the camera system 506, and causes the HMD 502 to display the images for display. The above-described processing is subsequently repeated, and the user views videos live-streamed from the camera system 506.

According to the camera system 506 in the first example, a plurality of sets of cameras configured to capture images in different directions are arranged in the vertical direction, and the different sets are rotated in the respective manners. This allows wide-angle images to be acquired while avoiding an excessive increase in the size of the camera system. Additionally, not only the parallax in the lateral direction but also the parallax in the longitudinal direction can be obtained. In addition, the parallax of a moving body can be accurately acquired.

The present invention has been descried on the basis of the first example. A person skilled in the art could understand that this example is illustrative and that various modifications can be made to the combinations of the components or processes of the example and that such modified examples are also within the scope of the present invention. Modified examples will be illustrated below.

Modified Example 1 will be described. The first image capturing section 510 of the camera system 506 may include color filters or organic photoelectric conversion films different from color filters or organic photoelectric conversion films in the second image capturing section 512 of the camera system 506. As a result, the first image capturing section 510 and the second image capturing section 512 may generate images in different colors. The first image capturing section 510 and the second image capturing section 512 may generate images based on light intensities in a total of four or more wavelength bands. For example, the first image capturing section 510 may generate RGB (Red, Green, and Blue) images, while the second image capturing section 512 may generate images based on the light intensity in a wavelength band other than the RGB wavelength band (for example, an infrared region or an ultraviolet region).

According to Modified Example 1, multispectrum data can be acquired for light incident from the subject, in other words, light intensities in four or more wavelength bands can be acquired. The use of the multispectrum data enables an increase in the accuracy of estimation of a light source (for example, identification of one of the sun, an LED (Light Emitting Diode), and a fluorescent light as a light source). Additionally, the accuracy of recognition of what the subject is or what the subject belongs to (for example, discrimination between water and alcohol) can be increased.

Modified Example 2 will be described. The HMD image generation section 530 may synthesize an image captured by the first image capturing section 510 and an image captured by the second image capturing section 512, to improve the image quality of images that the HMD 502 is caused to display. To synthesize the image captured by the first image capturing section 510 and the image captured by the second image capturing section 512, the HMD image generation section 530 may perform pattern matching based on a reference object (same stationary object or the like) included in both images.

Here, the HMD image generation section 530 may include an adjustment section configured to match, for the image captured by the first image capturing section 510 and the image captured by the second image capturing section 512, the colors in the images by using a color matrix or by synthesizing the data of the two images in a predetermined ratio (alpha blend or the like). For the image captured by the first image capturing section 510 and the image captured by the second image capturing section 512, the HMD image generation section 530 may also suitably (1) identify a correspondence relation between the pixels in the two images by pattern matching, (2) cause the adjustment section to match the colors in the two images, or (3) synthesize the two images. Modified Example 2 is suitably combined with Modified Example 1.

Figure 24:
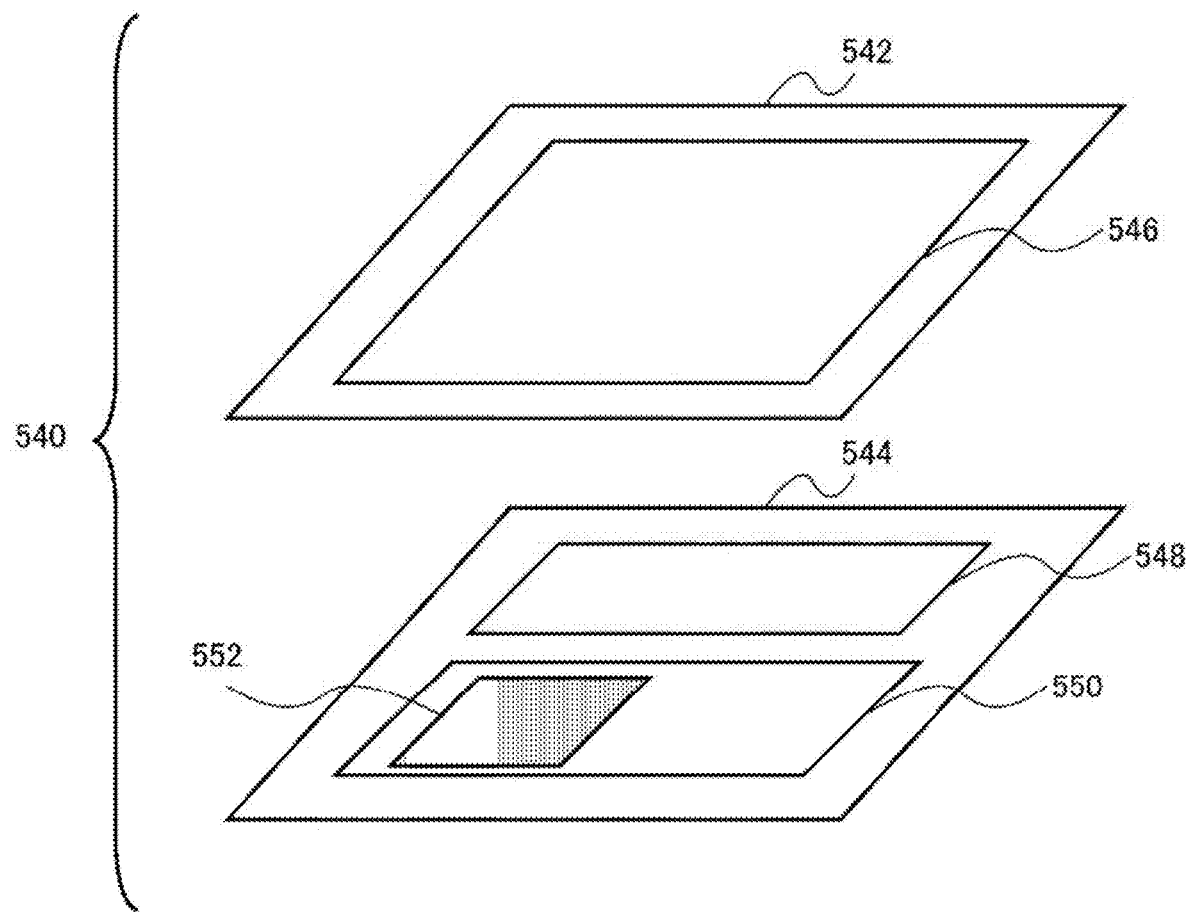
FIG. 24 is a diagram illustrating an example of image synthesis.

Modified Example 3 will be described. FIG. 24 schematically illustrates an image capturing element mounted in each of the plurality of cameras 514 in the first image capturing section 510 and the plurality of cameras 516 in the second image capturing section 512. Here, an image capturing element 540 is a layered image sensor and includes a first layer 542 and a second layer 544. The first layer 542 includes a pixel region 546 in which a plurality of pixels are arranged to receive light and perform photoelectric conversions. The second layer 544 includes a control circuit 548 configured to control the pixel region 546 and a logic circuit 550 configured to digitally process pixel data output from the pixel region 546.

Figure 25:
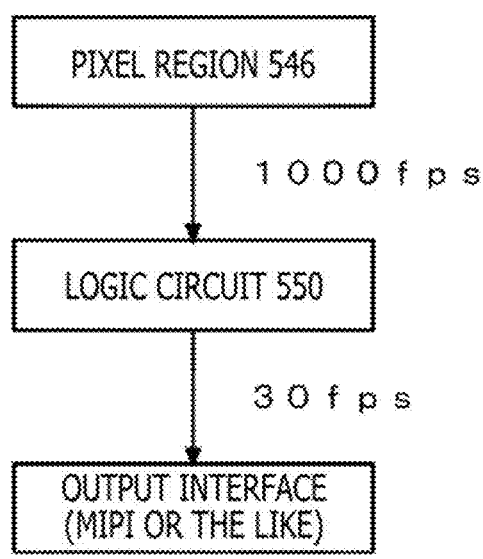
FIG. 25 is a conceptual diagram illustrating a flow of data in Modified Example 3.

The logic circuit 550 includes a memory 552 that can accumulate pixel signals. The memory 552 stores data read from the pixel region 546 and used to generate an image for output (for example, a plurality of pieces of RGB data corresponding to a plurality of pixels). FIG. 25 is a conceptual diagram illustrating a flow of data in Modified Example 3. The control circuit 548 or the logic circuit 550 reads data from the pixel region 546 at an image output rate (for example, 1000 fps (frames per second)) higher than a preset image output rate (for example, 30 fps) and stores the data in the memory 552.

The logic circuit 550 generates an image for output from the data stored in the memory 552, according to the preset image output rate (for example, 30 fps), and outputs the image for output to an output interface (for example, an MIPI (Mobile Industry Processor Interface) (registered trademark)). According to the configuration in Modified Example 3, data is read fast from the pixel region 546 into the memory 552 of the logic circuit 550, thus suppressing blurring of the image caused by movement of the camera, in other words, defocusing of the image. Additionally, according to the configuration in Modified Example 3, not only can a focal plane phenomenon (that is, distortion within one frame) be prevented but the moving distance of each frame can also be corrected in the logic circuit 550, and storage and addition processing can be executed in the corrected state. Videos resulting from the correction of the moving distance and the addition processing, and the like can be output from the logic circuit 550 to the output interface.

Modified Example 4 will be described. The camera system 506 may include an image capturing element 540 configured as illustrated in FIG. 24 (that is, a layered image sensor). Here, each of the first image capturing section 510 and the second image capturing section 512 may be implemented by a combination of the pixel region 546 and the logic circuit 550. Additionally, each of the captured image acquisition section 522 and the parallax acquisition section 524 may be implemented by a combination of the control circuit 548 and the logic circuit 550.

In Modified Example 4, the memory 552 may accumulate images (videos) for output. The captured image acquisition section 522 may store a plurality of captured images in the memory 552 in the time axis direction. The parallax acquisition section 524 may derive the parallax between a plurality of images stored in the memory 552. The image capturing element 540 may output parallax information along with image data. According to this aspect, the image capturing element derives the parallax, thus enabling a reduction in the load on and an increase in the speed of the image processing subsequent to the image capturing element.

Modified Example 5 will be described. In a case where the camera system 506 has a frame output rate of 30 fps, an image is typically generated approximately every 33 milliseconds. However, the cameras of the camera system 506 rotate even during the interval between image generations, images may be blurred. Thus, the camera system 506 may read data from pixel regions resulting from time division and included in an image in one frame, in other words, the camera system 506 may divide the image in one frame into small pieces, read the small pieces from the image capturing element a plurality of times, and correct the read data on the basis of the moving distance of the camera. The camera system 506 may add data corrected at a certain timing to data corrected at a preceding timing to generate an image in one frame.

For example, the first image capturing section 510 may include a pixel value acquisition section, a correction section, an image generation section, and an output section. The pixel value acquisition section repeats acquiring pixel data (here, a combination of coordinate values and a pixel value) in the pixel region from the image capturing element of each camera in the first image capturing section 510 at short time intervals (for example, approximately one millisecond). For example, in a case where pixel data is accumulated in the pixel region for 30 milliseconds, an image may be generated on the basis of pixel data accumulated for 30 milliseconds by repeating 30 times an operation in which once pixel data is accumulated for one millisecond, the pixel acquisition section reads and stores the pixel data in the memory and in which the image generation section adds the pixel data stored in the memory.

For the pixel value in the pixel region acquired by the pixel value acquisition section, the correction section corrects the coordinate values corresponding to the pixel value, on the basis of a known moving distance of the plurality of cameras 514 in the first image capturing section 510. For example, the correction section may change coordinate values associated with a certain pixel value, to a value resulting from translation in a direction opposite to the rotating direction of the first image capturing section 510. The image generation section synthesizes, on the basis of the corrected coordinate values, pixel data (combination of the coordinate values and the pixel value) read at a plurality of different timings and corrected by the correction section. Accordingly, the image generation section generates an image for one frame (referred to as a "captured image").

The output section outputs the captured image generated by the image generation section. Subsequently, the captured image is acquired by the captured image acquisition section 522 and the processing described above in the examples is executed on the image. The second image capturing section 512 may be configured similarly to the first image capturing section 510. According to Modified Example 5, degradation of quality of images (videos) can be suppressed that is caused by movement of the camera. For example, by repeatedly reading pixel data at short intervals of one millisecond or the like instead of simply reading pixel data accumulated for 30 milliseconds, Modified Example 5 is insusceptible to the adverse effect of blurring caused by movement of the camera. Additionally, by correcting each data read at short time intervals on the basis of the moving distance of the camera, possible blurring caused by addition of pixel data can be suppressed.

Modified Example 6 will be described. As partially described in conjunction with the related art, the camera system 506 may further include an irradiation section configured to irradiate the surrounding space (in other words, the subject of the camera system 506) of the camera system 506 with reference light based on infrared light and having a predetermined pattern. Image capturing elements (for example, infrared light receiving pixels) in the first image capturing section 510 and the second image capturing section 512 may detect reflected light resulting from reflection of the reference light from the surrounding space. Note that the reference light may be radiated in a random pattern.

The parallax acquisition section 524 may acquire the parallax of the subject on the basis of the pattern of the reflected light in the infrared region, and the distance acquisition section 526 may determine the distance to the subject from the parallax. According to this aspect, even a subject with few feature points (for example, a flat subject) can create feature points, allowing distances to be accurately detected.

Modified Example 7 will be described. The pixel array in at least one of the first image capturing section 510 and the second image capturing section 512 may be provided with polarizers transmitting a polarization component in a predetermined orientation included in the light transmitted through the lens (for example, the microlens). For example, at least one of the first image capturing section 510 and the second image capturing section 512 may include the image forming optical system 14, the diaphragm 18, and the image capturing element 20 as illustrated in FIG. 1 for the related art. The image capturing element 20 may include a two-dimensional array of pixels, and each of the pixels may have a structure in which microlenses, polarizers, and photodiodes are integrally layered.

A plurality of types of polarizers with a plurality of types of main axis angles may be provided in a plurality of image capturing sections (or in pixel units within a single image capturing section). According to this modified example, a polarization image (or a plurality of types of polarization images corresponding to a plurality of directions) can be obtained. Accordingly, the polarization image can be utilized to determine normal vectors on the subject surface. The technique described in Modified Example 6 is relatively ineffective for outdoor image capturing whereas the technique described in Modified Example 7 is effective even for outdoor image capturing.

Modified Example 8 related to Modified Example 7 will be described. At least one of the first image capturing section 510 and the second image capturing section 512 may be provided with an array of pixels each including photoelectric conversion sections (for example, photodiodes) corresponding to a unit converting light transmitted through the lens (for example, the microlens) into charge. In the array, the photoelectric conversion section may be provided in each of a plurality of partial regions into which the pixel region corresponding to one lens is divided. As described in conjunction with the related art, providing a plurality of photodiodes for one microlens allows obtainment of two phase difference images into which incident light is split.

The first image capturing section 510 (and/or the second image capturing section 512) provided with the photoelectric conversion section may generate one or more pairs of phase difference images. The parallax acquisition section 524 may detect, as parallax, the amount of misalignment ("phase difference" in the related art) of an image of the same subject between the two phase difference images of the pair. Additionally, the distance acquisition section 526 may utilize the phase difference indicated by the phase difference images to acquire the distance to the subject. In this manner, the image capturing section also determines the parallax and depth of the subject, enabling an increase in the accuracy at which the parallax and depth of the subject are estimated.

Modified Example 9 will be described. A server may be interposed between the camera system 506 and the game apparatus 504. The server may execute relay processing of receiving orientation information from the game apparatus 504 and transferring the orientation information to the camera system 506, and receiving an image for display transmitted from the camera system 506 and transferring the image for display to the game apparatus 504. Additionally, the server may store a plurality of images for display generated by the camera system 506 in advance. In the case of receiving the orientation information from the game apparatus 504, the server may transmit, to the game apparatus 504, an image for display corresponding to the orientation of the HMD 502.

Modified Example 10 will be described. FIG. 26(a) and FIG. 26(b) are diagrams illustrating an arrangement aspect of the cameras in the camera system 506 in Modified Example 10. FIG. 26(a) schematically illustrates the camera system 506 as viewed from above, and FIG. 26(b) schematically illustrates the camera system 506 as viewed from the side. The camera system 506 includes a 360-degree camera 574 corresponding to the first image capturing section 510 in the first example, and an image capturing section 570 corresponding to the second image capturing section 512 in the first example. Note that the vertical positions of the 360-degree camera 574 and the image capturing section 570 may be reversed.

The 360-degree camera 574 captures images of space through 360 degrees around the camera system 506. The 360-degree camera 574 may also be referred to as a whole-sky camera or an omnidirectional camera. The 360-degree camera 574 may be rotatable or may be fixed. Even in a case where the 360-degree camera 574 is fixed, a plurality of cameras 572 in the image capturing section 570 rotate clockwise or counterclockwise to allow the camera system 506 in Modified Example 10 to produce effects similar to those of the camera system 506 in the first example. For example, parallax information and depth information regarding a moving body can be acquired.

Second Example

The entertainment system 500 in the second example has a configuration similar to that of the entertainment system 500 in the first example (FIG. 21). The camera system 506 in the second example also has a functional configuration similar to that of the camera system 506 in the first example (FIG. 23). However, the camera system 506 in the second example differs from the camera system 506 in the first example in that only a part of the surrounding space (360 degrees) is captured and that a plurality of cameras are provided only in one stage. Contents described in the first example are appropriately omitted below.

Figure 27:
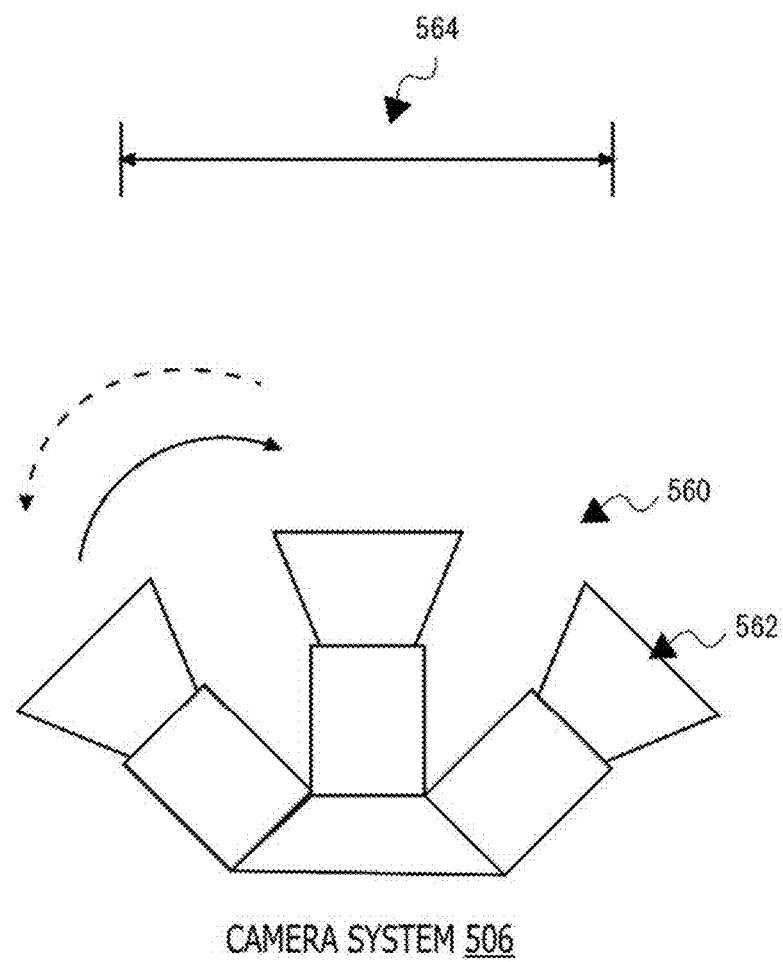
FIG. 27 is a diagram illustrating an arrangement aspect of cameras in a camera system in a second example.

FIG. 27 illustrates an arrangement aspect of the cameras in the camera system 506 in the second example. FIG. 27 schematically illustrates appearance of the camera system 506 as viewed from above. The camera system 506 includes the image capturing section 560. The image capturing section 560 includes a plurality of horizontally arranged video cameras (in FIG. 27, three cameras 562).

The drive section 520 of the camera system 506 constantly rotates the image capturing section 560 (that is, the plurality of cameras 562) in the horizontal direction. For the rotating direction of the image capturing section 560, the drive section 520 switches between a clockwise direction illustrated by a solid line and a counterclockwise direction illustrated by a dashed line. However, the drive section 520 rotates the image capturing section 560 to the extent that at least one camera 562 can capture images of a specific region 564 corresponding to a specific spatial region included in the surrounding space of the camera system 506 and that is to be displayed by the HMD 502. In other words, the drive section 520 rotates the image capturing section 560 to the extent that the specific region 564 is within the angle of view of one camera 562 or the angle of view formed by a plurality of cameras 562.

The parallax acquisition section 524 of the camera system 506 acquires parallax information regarding a subject present in the specific region 564 on the basis of a plurality of images captured by one or more cameras 562 as is the case with the first example. The camera system 506 in the second example fails to acquire the parallax in the vertical direction, but can acquire an image with a relatively wide angle of view while avoiding an excessive increase in the size of the camera system. Additionally, the parallax of a stationary object in the lateral direction can be acquired.

In the second example, on the basis of the moving distance of the image capturing section 560 (that is, the plurality of cameras 562) or a stationary object present in the specific region 564, the HMD image generation section 530 may correct at least one of a plurality of images such that the viewpoints of the plurality of images coincide with one another. Accordingly, the HMD image generation section 530 can avoid misalignment of images of the specific region 564 caused by rotation of the image capturing section 560, and generate, as images for display, a time series of images (that is, video) of the specific region 564 as viewed from a fixed viewpoint.

For example, for a plurality of images depicting the state of the specific region 564 and captured at different timings by the same camera 562 or a plurality of cameras 562, the HMD image generation section 530 may convert the coordinates of pixel values for at least one of the images. For example, the HMD image generation section 530 may convert the coordinates of the pixel values for at least one image on the basis of a known moving distance of the image capturing section 560 (or a moving distance detected by a gyro sensor or the like) to make the viewpoints of the plurality of images coincide with one another. Additionally, in a case where the stationary object (pole or the like) present in the specific region 564 is known, the coordinates of the pixel values for at least one of the plurality of images may be converted to align the position of the stationary object between the plurality of images.

Additionally, the camera system 506 in the second example may further include a moving body detection section (not illustrated) configured to detect a moving subject. Like the HMD image generation section 530 described above, the moving body detection section may correct at least one of a plurality of images such that the viewpoints of the plurality of images coincide with one another, on the basis of the moving distance of the image capturing section 560 (that is, the plurality of cameras 562) or the stationary object present in the specific region 564. The moving body detection section may compare the data of the plurality of images with the viewpoints coinciding with one another to detect a difference between the images as a moving body present in the specific region 564.

The parallax acquisition section 524 may use a detection result from the moving body detection section to acquire parallax information regarding the surrounding space of the camera system 506. Additionally, the HMD image generation section 530 may use the image corrected by the moving body detection section to generate an image for display. According to this aspect, the accuracy of detection of the moving body present in the surrounding space of the camera system 506 can be increased.

The present invention has been described on the basis of the second example. A person skilled in the art could understand that this example is illustrative and that various modifications can be made to the combinations of the components or processes of the example and that such modified examples are also within the scope of the present invention.

Third Example

The entertainment system 500 in the third example has a configuration similar to that of the entertainment system 500 in the first example (FIG. 21). The camera system 506 in the third example also has a functional configuration similar to that of the camera system 506 in the first example (FIG. 23). However, the camera system 506 in the third example differs from the camera system 506 in the first example in a rotation aspect of the plurality of cameras. Contents described in the first example are appropriately omitted below.

Figure 28:
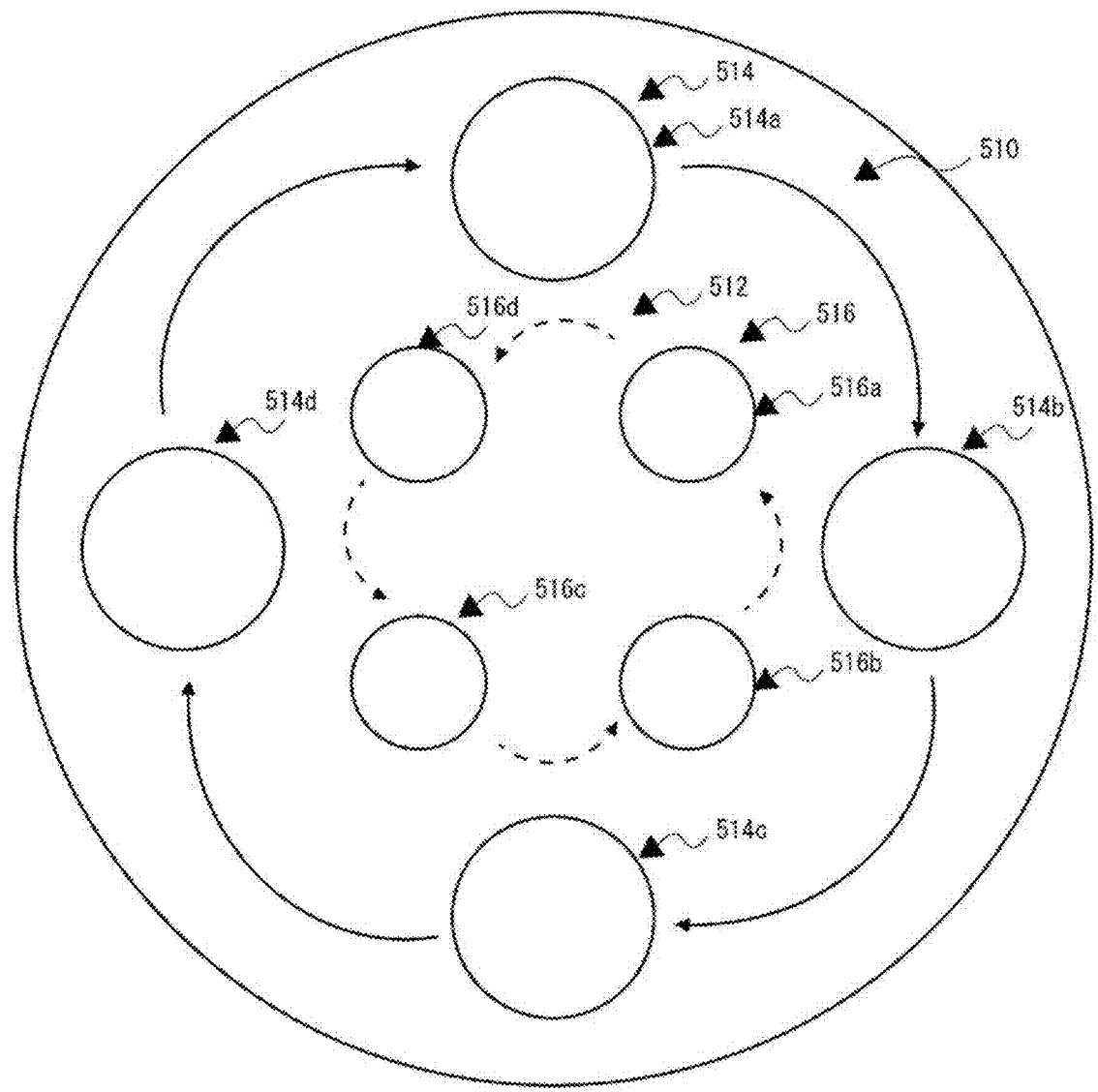
FIG. 28 is a diagram illustrating an arrangement aspect of cameras in a camera system in a third example.

FIG. 28 illustrates an arrangement aspect of the cameras in the camera system 506 in the third example. FIG. 28 schematically illustrates appearance of the camera system 506 as viewed from the front side (in other words, from the subject side). The camera system 506 includes the first image capturing section 510 and the second image capturing section 512. The first image capturing section 510 includes a camera 514a, a camera 514b, a camera 514c, and a camera 514d (for a generic term, referred to as the "camera 514") provided on an outer peripheral side of the camera system 506. The second image capturing section 512 includes a camera 516a, a camera 516b, a camera 516c, and a camera 516d (for a generic term, referred to as the "camera 516") provided on an inner peripheral side of the camera system 506.

In the plurality of cameras 514 in the first image capturing section 510, the lenses face a specific spatial region to be displayed by the HMD 502 (also designated as a specific direction and hereinafter referred to as the "specific region 564" illustrated in FIG. 27), and images of the subject present in the specific region 564 are simultaneously captured from different angles. Similarly, in the plurality of cameras 516 in the second image capturing section 512, the lenses face the specific region 564, and images of the subject present in the specific region 564 are simultaneously captured from different angles. Specifically, the plurality of cameras provided in the camera system 506 capture images of the same subject from the different angles.

Note that the plurality of cameras included in the camera system 506 may be installed such that the cameras have the same optical axis direction (in other words, the direction in which image capturing is performed). Alternatively, at least one of the plurality of cameras may be installed such that the optical axis direction of this camera is different from the optical axis direction of the other cameras. For example, the plurality of cameras included in the camera system 506 may be installed such that the cameras in the first image capturing section 510 (cameras on an outer side of the camera system 506) have an optical axis direction different from that of the cameras in the second image capturing section 512 (cameras on an inner side of the camera system 506).

The drive section 520 of the camera system 506 constantly rotates the plurality of cameras 514 in the first image capturing section 510 and the plurality of cameras 516 in the second image capturing section 512 in the vertical direction. In other words, the drive section 520 rotates the plurality of cameras 514 clockwise or counterclockwise, and similarly rotates the plurality of cameras 516 clockwise or counterclockwise. In the example in FIG. 28, the drive section 520 rotates the plurality of cameras 514 in the first image capturing section 510 clockwise while rotating the plurality of cameras 516 in the second image capturing section 512 counterclockwise.

Figure 29:
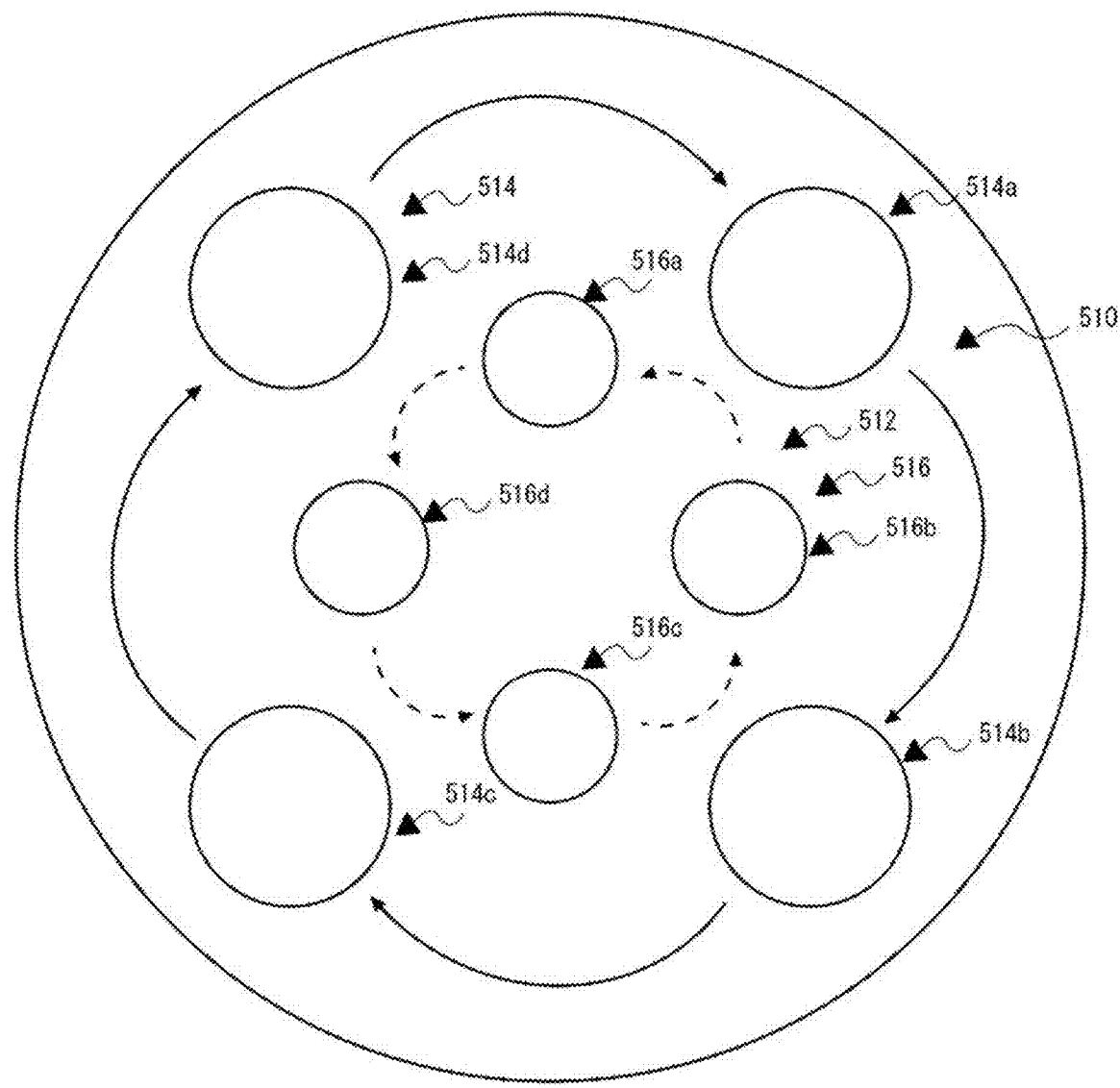
FIG. 29 is a diagram schematically illustrating that cameras have been rotated.

FIG. 29 schematically illustrates that the cameras have been rotated. FIG. 29 illustrates that the plurality of cameras 514 in the first image capturing section 510 in the state in FIG. 28 have been rotated clockwise through 45 degrees and that the plurality of cameras 516 in the second image capturing section 512 in the state in FIG. 28 have been rotated counterclockwise through 45 degrees.

In a modified example, one of the first image capturing section 510 and the second image capturing section 512 may be stationary, or both the first image capturing section 510 and the second image capturing section 512 may rotate in the same direction. Additionally, the size of the cameras in the first image capturing section 510 and the second image capturing section 512 is not limited, and the first image capturing section 510 and the second image capturing section 512 may include cameras with a variety of optical sizes.

The camera system 506 in the third example generates an image that the HMD 502 is caused to display, on the basis of an image captured by the camera at the position corresponding to the orientation of the HMD 502 detected by the orientation detection section 528.

Specifically, the parallax acquisition section 524 of the camera system 506 acquires parallax information on the basis of images captured by the plurality of cameras at the positions corresponding to the orientation of the HMD 502 detected by the orientation detection section 528. For example, in a case where the camera system 506 is in the state illustrated in FIG. 28 and where the HMD 502 lies in a normal orientation and faces forward (that is, the head of the user is not tilted), the parallax acquisition section 524 may acquire parallax information regarding the specific region 564 on the basis of a captured image from the camera 514b and a captured image from the camera 514d.

Additionally, in a case where the camera system 506 is in the state illustrated in FIG. 29 and where the HMD 502 is oriented to face sideways (that is, the head of the user is tilted to the side), the parallax acquisition section 524 may acquire parallax information regarding the specific region 564 on the basis of a captured image from the camera 516a and a captured image from the camera 516c. Additionally, in a case where the camera system 506 is in the state illustrated in FIG. 29 and where the HMD 502 is oriented to face obliquely rightward (that is, the head of the user is tilted obliquely rightward), the parallax acquisition section 524 may acquire parallax information regarding the specific region 564 on the basis of a captured image from the camera 514a and a captured image from the camera 514c.

The HMD image generation section 530 of the camera system 506 generates images for display on the basis of the parallax information acquired by the parallax acquisition section 524 as is the case with the first example. According to the camera system 506 in the third example, suitable parallax information following the movement of the user can be obtained. Additionally, the cameras of the camera system 506 rotate to allow obtainment of parallax information consistent with many possible postures taken by the user. This provides more accurate video experience in a case where the user wearing the HMD 502 moves the head.

The present invention has been described on the basis of the third example. A person skilled in the art could understand that this example is illustrative and that various modifications can be made to the combinations of the components or processes of the example and that such modified examples are also within the scope of the present invention.

Optional combinations of the above-described examples and modified examples are also useful as embodiments of the present invention. New embodiments resulting from the combinations include the effects of the combined examples and modified examples. Additionally, a person skilled in the art could understand that functions to be accomplished by components described in claims are implemented by the unitary components illustrated in the examples and modified examples or by cooperation of the components of the examples and modified examples.

REFERENCE SIGNS LIST

506 Camera system
510 First image capturing section
512 Second image capturing section
520 Drive section
522 Captured image acquisition section
524 Parallax acquisition section
526 Distance acquisition section
528 Orientation detection section
530 HMD image generation section
532 Image output section

INDUSTRIAL APPLICABILITY

The present invention is applicable to a system including a plurality of cameras.

The invention claimed is:
1. A camera system comprising:
a plurality of cameras simultaneously capturing images in different directions,
wherein an image capturing element in each of the cameras includes a two-dimensional array of pixels and each pixel includes at least one of a microlens layer, a color filter layer, a polarizer layer, and a photoelectric conversion layer;
a drive section configured to rotate the plurality of cameras in a predetermined direction; and
a parallax acquisition section, wherein
the plurality of cameras are configured such that, even during rotation, one of the cameras captures an image of a preset specific region, and
the parallax acquisition section acquires parallax information regarding an object present in the specific region on a basis of a plurality of captured images of the specific region, wherein the plurality of cameras comprises:
a first image capturing section including a plurality of cameras; and
a second image capturing section including a plurality of cameras, wherein
the first and second image capturing sections are placed on top of each other in a height direction so that one of the image capturing sections is an upper section and the other image capturing section is a lower section relative to each other, and
the drive section rotates the plurality of cameras in the first image capturing section and the plurality of cameras in the second image capturing section around a vertical axis extending through a center of both the upper and lower sections and, in a case of rotating both the set of the plurality of cameras in the first image capturing section and the set of the plurality of cameras in the second image capturing section, the drive section rotates the upper section and lower section in different directions or at different speeds relative to each other.

2. The camera system according to claim 1, wherein the parallax acquisition section compares moving distances of an identical subject detected in both an image captured by the first image capturing section and an image captured by the second image capturing section to acquire information regarding parallax of the subject caused by rotation of at least one of the first image capturing section and the second image capturing section.

3. The camera system according to claim 2, further comprising: a distance acquisition section configured to acquire a distance from some of the cameras to the subject on a basis of the information regarding the parallax caused by the rotation.

4. The camera system according to claim 1, wherein the first image capturing section includes a color filter or an organic photoelectric conversion film different from a color filter or an organic photoelectric conversion film in the second image capturing section.

5. The camera system according to claim 1, further comprising: an adjustment section configured to match a color of an image captured by the first image capturing section with a color of an image captured by the second image capturing section by using a color matrix or by synthesizing data of both images.

6. The camera system according to claim 1, wherein
an image capturing element included in each of the plurality of cameras includes a memory configured to store data used to generate an image for output and read from a pixel region, and
the image capturing element reads the data from the pixel region at a rate higher than an image output rate and stores the data in the memory.

7. The camera system according to claim 1, further comprising:
a sensor configured to detect a moving distance of the plurality of cameras, wherein
the parallax acquisition section acquires the parallax information on a basis of the moving distance detected by the sensor.

8. The camera system according to claim 1, further comprising:
a generation section configured to read data from pixel regions resulting from time division and included in an image in one frame, correct the read data on a basis of a moving distance of the plurality of cameras, and add the corrected data to pixel data read at another timing to generate the image in the one frame.

9. The camera system according to claim 1, further comprising:
a generation section configured to correct at least one of the plurality of images to make viewpoints of the plurality of images coincide with one another on a basis of a moving distance of the plurality of cameras or a stationary object present in the specific region, to generate a video of the specific region as viewed from a fixed viewpoint.

10. The camera system according to claim 1, further comprising:
a detection section configured to correct at least one of the plurality of images to make viewpoints of the plurality of images coincide with one another on a basis of a moving distance of the plurality of cameras or a stationary object present in the specific region, to detect a moving body present in the specific region.

11. The camera system according to claim 1, wherein
the plurality of cameras simultaneously capture images of an identical subject from different angles, the camera system further comprising:
an orientation detection section configured to detect an orientation of a head mounted display; and
a generation section configured to generate an image that the head mounted display is caused to display, on a basis of an image captured by a camera included in the plurality of cameras and located at a position corresponding to the orientation of the head mounted display detected by the orientation detection section.

12. The camera system according to claim 1, wherein
the image capturing element converts an intensity of incident light into charge and outputs the charge.

13. The camera system according to claim 12, wherein the photodiodes are provided in a layer below the polarizers and output charge representing a luminance of polarization components in four directions corresponding to increments of 45°.

14. The camera system according to claim 1, wherein a plurality of photodiodes are provided for each microlens in the microlens layer to acquire two phase difference images resulting from splitting of incident light.

15. The camera system according to claim 14, wherein a distance to a subject is identified by determining a focal length and a phase difference, wherein the phase difference is based on a difference in luminance detected by a left photodiode and a right photodiode of the plurality of photodiodes.

16. The camera system according to claim 1, wherein color filters in the color filter layer are in a Bayer array, and each of the pixels detects one of red light, green light, and blue light.

17. The camera system according to claim 1, wherein the upper and lower sections are disposed in parallel planes with respect to each other.

18. The camera system according to claim 17, wherein one of the upper and lower sections is rotated in a clockwise direction and the other of the upper and lower sections is rotated in a counterclockwise direction.

19. A camera system comprising:
a plurality of cameras configured to simultaneously capture images of an identical subject from different angles,
wherein an image capturing element in each of the cameras includes a two-dimensional array of pixels and each pixel includes at least one of a microlens layer, a color filter layer, a polarizer layer, and a photoelectric conversion layer;

a drive section configured to rotate the plurality of cameras in a predetermined direction to change positions of the plurality of cameras;

an orientation detection section configured to detect an orientation of a head mounted display; and a generation section configured to generate an image that the head mounted display is caused to display, on a basis of an image captured by a camera included in the plurality of cameras and located at a position corresponding to the orientation of the head mounted display detected by the orientation detection section, wherein the plurality of cameras comprises:

a first image capturing section including a plurality of cameras; and a second image capturing section including a plurality of cameras, wherein the first and second image capturing sections are placed on top of each other in a height direction so that one of the image capturing sections is an upper section and the other image capturing section is a lower section relative to each other, and the drive section rotates the plurality of cameras in the first image capturing section and the plurality of cameras in the second image capturing section around a vertical axis extending through a center of both the upper and lower sections and, in a case of rotating both the set of the plurality of cameras in the first image capturing section and the set of the plurality of cameras in the second image capturing section, the drive section rotates the upper section and lower section in different directions or at different speeds relative to each other.

* * * * *